United States Patent
Matsumoto et al.

(10) Patent No.: US 11,703,647 B2
(45) Date of Patent: Jul. 18, 2023

(54) OPTICAL FIBER SECURING STRUCTURE AND LASER DEVICE

(71) Applicant: FUJIKURA LTD., Tokyo (JP)

(72) Inventors: Ryokichi Matsumoto, Chiba (JP); Yoshitaka Nakamura, Chiba (JP); Naoyuki Sugiyama, Chiba (JP); Hiroto Nakazato, Tokyo (JP); Yasushi Oikawa, Chiba (JP); Akari Takahashi, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/631,784

(22) PCT Filed: Sep. 14, 2020

(86) PCT No.: PCT/JP2020/034662
§ 371 (c)(1),
(2) Date: Jan. 31, 2022

(87) PCT Pub. No.: WO2021/070567
PCT Pub. Date: Apr. 15, 2021

(65) Prior Publication Data
US 2022/0269018 A1 Aug. 25, 2022

(30) Foreign Application Priority Data

Oct. 8, 2019 (JP) .................................. 2019-185278
Feb. 17, 2020 (JP) .................................. 2020-024236

(51) Int. Cl.
*G02B 6/38* (2006.01)
*G02B 6/255* (2006.01)
(Continued)

(52) U.S. Cl.
CPC .......... *G02B 6/3889* (2013.01); *G02B 6/2556* (2013.01); *G02B 6/0218* (2013.01); *G02B 6/46* (2013.01)

(58) Field of Classification Search
None
See application file for complete search history.

(56) References Cited

U.S. PATENT DOCUMENTS 4,662,713 A * 5/1987 Davies ................. G02B 6/3636
385/71
4,753,515 A * 6/1988 Sato ..................... G02B 6/3801
385/59
(Continued)

FOREIGN PATENT DOCUMENTS

CN 103606805 A 2/2014
CN 108885306 A 11/2018
(Continued)

OTHER PUBLICATIONS

Written Opinion issued in corresponding International Application No. PCT/JP2020/034662 dated Dec. 1, 2020 (3 pages).
(Continued)

*Primary Examiner* — Jerry Rahll
(74) *Attorney, Agent, or Firm* — Osha Bergman Watanabe & Burton LLP

(57) ABSTRACT

An optical fiber securing structure includes: an optical fiber including a coating, and a coating-removed section in which a partial section of the coating is removed from the optical fiber; a reinforcement member including main surfaces and a groove formed from one of the main surfaces toward an inside of the reinforcement member, where the groove has a pair of side walls and a bottom wall; and a resin member that secures the coating-removed section to the pair of side walls and the bottom wall. A bottom part of the groove that includes the bottom wall has a widthwise cross-sectional (Continued)

shape where the bottom wall constitutes a trapezoidal shape such that a distance between the pair of side walls becomes greater in a direction away from the bottom wall.

9 Claims, 9 Drawing Sheets

(51) Int. Cl.
  *G02B 6/02* (2006.01)
  *G02B 6/46* (2006.01)

(56) References Cited

U.S. PATENT DOCUMENTS

| | | | | |
|---|---|---|---|---|
| 4,772,087 | A * | 9/1988 | Ito | G02B 6/3888 385/83 |
| 5,151,964 | A * | 9/1992 | Carpenter | G02B 6/3839 385/71 |
| 5,155,781 | A * | 10/1992 | Doss | G02B 6/3839 385/71 |
| 6,195,495 | B1 * | 2/2001 | Ota | G02B 6/3855 385/71 |
| 6,215,945 | B1 * | 4/2001 | Fukuyama | G02B 6/3839 385/89 |
| 2004/0165854 | A1 * | 8/2004 | Niiyama | G02B 6/3636 385/137 |
| 2018/0067262 | A1 * | 3/2018 | Larson | G02B 6/2555 |
| 2019/0235171 | A1 | 8/2019 | Brusberg et al. | |
| 2020/0326485 | A1 * | 10/2020 | Simmons | G02B 6/3821 |
| 2020/0386950 | A1 * | 12/2020 | Simmons | G02B 6/3636 |
| 2020/0408997 | A1 * | 12/2020 | Arao | G02B 6/3652 |

FOREIGN PATENT DOCUMENTS

| | | |
|---|---|---|
| CN | 109073832 A | 12/2018 |
| JP | H07-209542 A | 8/1995 |
| JP | H11-014860 A | 1/1999 |
| JP | 2019-045853 A | 3/2019 |
| WO | 2016/056659 A1 | 4/2016 |

OTHER PUBLICATIONS

International Search Report issued in corresponding International Application No. PCT/JP2020/034662 dated Dec. 1, 2020 (6 pages).
International Preliminary Report on Patentability issued in corresponding International Application No. PCT/JP2020/034662 dated Apr. 12, 2022 (4 pages).

* cited by examiner

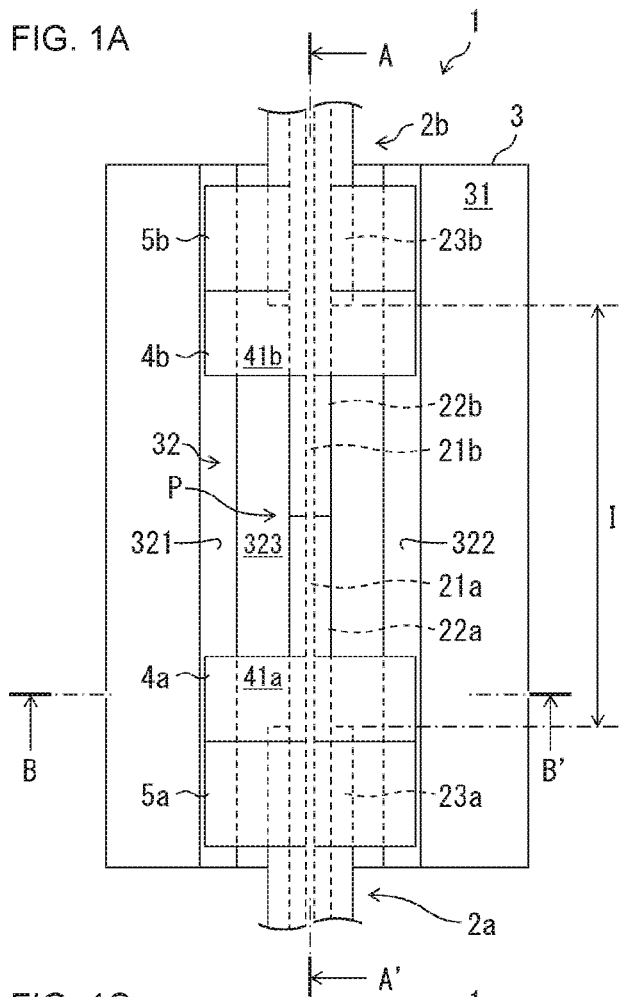
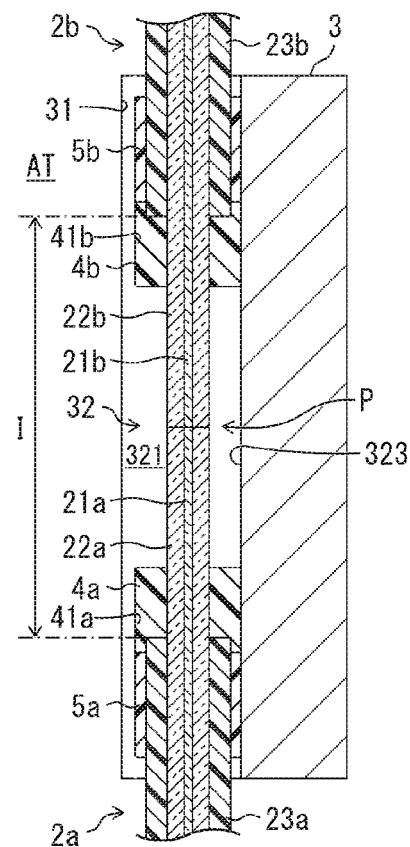
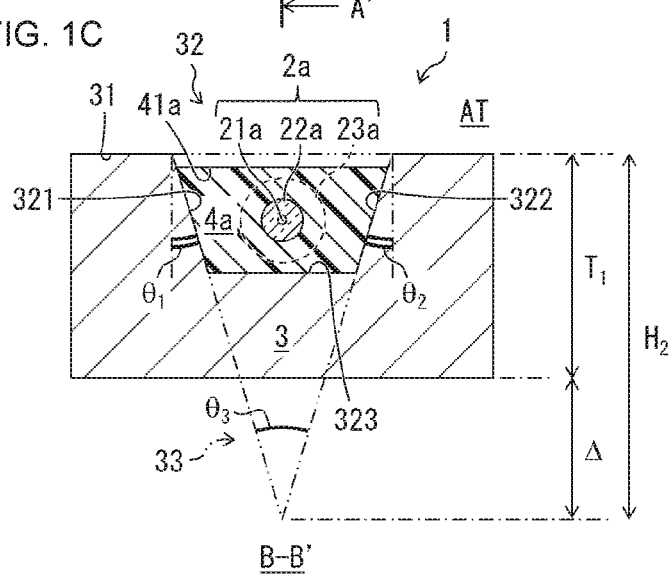

CROSS-SECTIONAL VIEW TAKEN ALONG LINE B-B

CROSS-SECTIONAL VIEW TAKEN ALONG LINE C-C

OPTICAL FIBER SECURING STRUCTURE AND LASER DEVICE

TECHNICAL FIELD

The present invention relates to an optical fiber securing structure in which an optical fiber is secured to a reinforcement member, and also relates to a laser device which has such an optical fiber securing structure.

BACKGROUND

Securing structures in which optical fibers are secured to reinforcement members are widely used. For example, Patent Literature 1 discloses a reinforcement structure (corresponding to a "securing structure" as described above) in which optical fibers are secured to a heat-resistant reinforcement body (corresponding to a "reinforcement member" as described above) with use of an adhesive. This securing structure includes (i) the optical fibers end surfaces of which are butted onto each other and fused together and (ii) the heat-resistant reinforcement body. In a vicinity of a fusion-spliced point of the optical fibers, the optical fibers have a coating-removed section in which coatings are removed so that quartz glass parts are exposed. The heat-resistant reinforcement body is a rectangular parallelepiped-shaped member which has a V-shaped groove formed in one of main surfaces thereof. The optical fibers are disposed inside this V-shaped groove, and are secured to the heat-resistant reinforcement member body by an adhesive with which the V-shaped groove is filled.

Note that it is possible to use the reinforcement structure disclosed in Patent Literature 1 also as a cladding mode stripper. In this case, as an optical fiber, an optical fiber which includes a cladding and a core each made of quartz glass is employed, and a coating-removed section of the optical fiber which coating-removed section does not include a fusion-spliced point is secured inside the V-shaped groove with use of a high-refractive-index resin member having a refractive index higher than that of the cladding of the optical fiber.

PATENT LITERATURE

Patent Literature 1

Japanese Patent Application Publication Tokukaihei No. 7-209542

A configuration in which an optical fiber is disposed inside a V-shaped groove and secured inside the V-shaped groove with use of a resin member has advantage that it is possible to suppress a stress which acts on the optical fiber, as compared with a configuration in which the optical fiber is disposed inside a rectangular groove and secured inside the rectangular groove with use of a resin member.

A stress which acts on an optical fiber can cause a deterioration of the beam quality of a beam emitted from the optical fiber. Therefore, a stress which acts on an optical fiber is preferably low.

On the other hand, in a case where a V-shaped groove is formed in a reinforcement member, a distance between a pair of main surfaces, i.e., the thickness of the reinforcement member is likely to be greater than that of a reinforcement member in which a rectangular groove is formed.

FIG. 7 is a graph showing, with regard to a V-shaped groove, the relationship between (i) an angle θ formed by side walls (vertex angle of a groove) and (ii) a ratio of the depth of the groove to the width of the groove. For example, in a case where the angle θ formed by the side walls is 45 degrees, the ratio of the depth of the groove to the width of the groove is approximately 2.4. This means that the thickness of a reinforcement member in which the groove is formed needs to be approximately more than 2.4 times as great as the width of the groove.

SUMMARY

One or more embodiments of the present invention realize an optical fiber securing structure in which it is possible to make the thickness of a reinforcement member thinner than that of a conventional reinforcement member.

An optical fiber securing structure in accordance with one or more embodiments of the present invention is an optical fiber securing structure including: an optical fiber which has a coating-removed section that is formed by removing a partial section of a coating; a reinforcement member which has a groove that is formed from one of main surfaces toward an inside and that has a pair of side walls and a bottom wall; and a resin member which secures the coating-removed section to the pair of side walls and the bottom wall, a widthwise cross-sectional shape of a bottom part of the groove which bottom part includes the bottom wall being a trapezoidal shape such that a distance between the pair of side walls becomes greater in a direction away from the bottom wall.

An optical fiber securing structure in accordance with one or more embodiments of the present invention is an optical fiber securing structure including: a plurality of first optical fibers each of which includes a core, a cladding that surrounds the core and that has a refractive index lower than that of the core, and a coating that surrounds the cladding; at least one second optical fiber which includes a core, a cladding that surrounds the core and that has a refractive index lower than that of the core, and a coating that surrounds the cladding; a reinforcement member which has a fiber groove that is formed in a first surface so as to extend in a lengthwise direction, the fiber groove being a groove inside which a coating-removed part of each of the plurality of first optical fibers, which coating-removed part is obtained by removing the coating of the each of the plurality of first optical fibers, and a coating-removed part of the at least one second optical fiber, which coating-removed part is obtained by removing the coating of the at least one second optical fiber, are accommodated; and a securing resin which secures, inside the fiber groove of the reinforcement member, the coating of each of the plurality of first optical fibers and the coating of the at least one second optical fiber. The fiber groove has a bottom surface at a given depth from the first surface of the reinforcement member. On a cross section of a part of the reinforcement member in which part the securing resin secures the coatings of the plurality of first optical fibers or the coating of the at least one second optical fiber, a width of the bottom surface of the fiber groove is greater than a diameter of a minimum circle which encloses the coatings of all of the plurality of first optical fibers. A width of an opening of the fiber groove which opening is located on the first surface of the reinforcement member is greater than the width of the bottom surface of the fiber groove. In one or more embodiments, the width of the bottom surface of the fiber groove may be not more than 2.5 times, or not more than twice as great, as the diameter of the minimum circle. In one or more embodiments, the width of the opening of the fiber groove may be not more than 1.5 times as great as the width of the bottom surface of the fiber groove.

A laser device in accordance with one or more embodiments of the present invention includes an optical fiber securing structure in accordance with one or more embodiments of the present invention.

According to one or more embodiments of the present invention, it is possible to realize an optical fiber securing structure in which it is possible to make the thickness of a reinforcement member thinner than that of a conventional reinforcement member. Furthermore, according to one or more embodiments of the present invention, it is possible to realize a laser device in which it is possible to reduce a space occupied by a reinforcement member.

BRIEF DESCRIPTION OF DRAWINGS

FIG. 1A is a plan view of an optical fiber securing structure in accordance with one or more embodiments of the present invention. FIG. 1B is a longitudinal cross-sectional view of the optical fiber securing structure illustrated in FIG. 1A. FIG. 1C is a widthwise cross-sectional view of the optical fiber securing structure illustrated in FIG. 1A.

DETAILED DESCRIPTION

Figure 2:
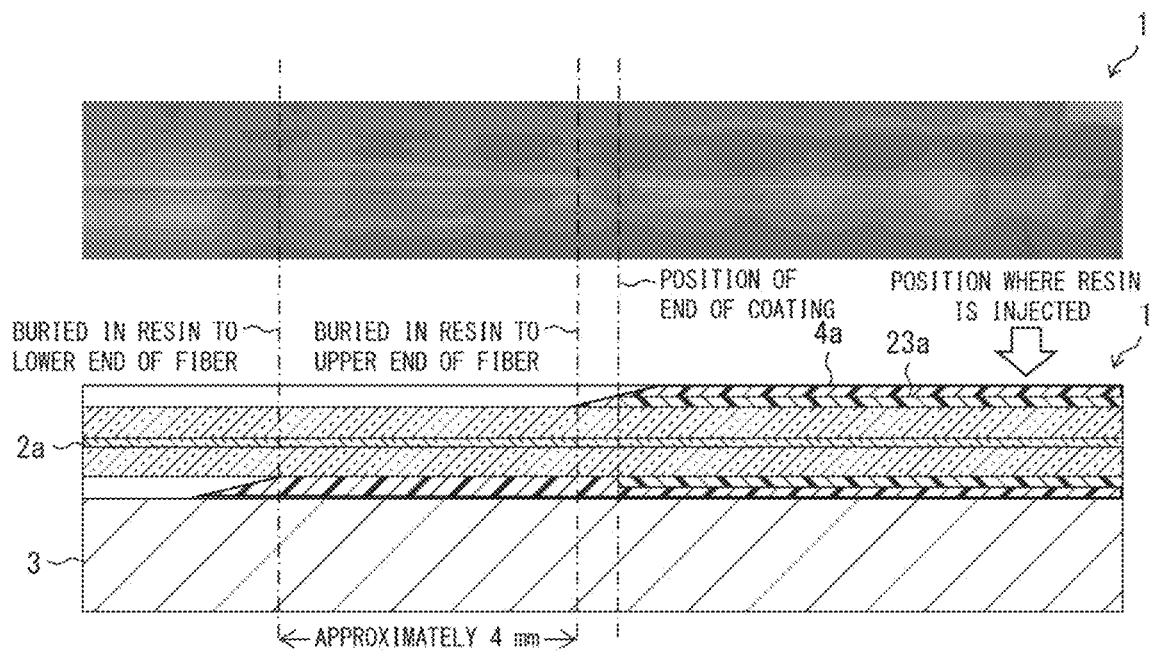
FIG. 2 shows a photograph (upper), taken from above, and a cross-sectional view each illustrating spreading of a resin material in wet condition which was injected into a groove, in Example 1 (the sum of inclination angles of side walls of the groove was set to 30 degrees) of the optical fiber securing structure illustrated in FIGS. 1A-1C.

The following description will discuss an optical fiber securing structure 1 in accordance with one or more embodiments of the present invention, with reference to FIGS. 1A-1C. FIG. 1A is a plan view of the optical fiber securing structure 1. FIG. 1B is a longitudinal cross-sectional view of the optical fiber securing structure 1. FIG. 1C is a widthwise cross-sectional view of the optical fiber securing structure 1. A straight line AA' illustrated in FIG. 1A is a straight line which coincides with the central axis of each of optical fibers 2a and 2b. A straight line BB' illustrated in FIG. 1A is a straight line perpendicular to the central axis of each of the optical fibers 2a and 2b and parallel to a main surface 31 of a reinforcement member 3. Note that the central axis of each of the optical fibers 2a and 2b and the main surface 31 will be described later.

<Configuration of Optical Fiber Securing Structure 1>

The optical fiber securing structure 1 is a securing structure in which a coating-removed section of optical fibers which includes a fusion-spliced point of the optical fibers is secured to a reinforcement member. As illustrated in FIGS. 1A-1C, the optical fiber securing structure 1 includes the optical fibers 2a and 2b, the reinforcement member 3, first resin members 4a and 4b, and second resin members 5a and 5b.

(Optical Fibers 2a and 2b)

The optical fiber 2a is a single-cladding fiber, and includes a core 21a, a cladding 22a, and a coating 23a. The optical fiber 2b is a single-cladding fiber, and includes a core 21b, a cladding 22b, and a coating 23b. The optical fibers 2a and 2b are configured identically. Therefore, in one or more embodiments, the optical fibers 2a and 2b are described while the optical fiber 2a is taken as an example, and the optical fiber 2b will be not described.

In the optical fiber 2a of one or more embodiments, the core 21a and the cladding 22a are each made of glass containing quartz as a main component. To at least any one of the core 21a and the cladding 22a, a dopant is added as appropriate. This is to cause the refractive index of the core 21a to be higher than that of the cladding 22a. The cladding 22a covers an outer surface of the core 21a.

In the optical fiber 2a of one or more embodiments, the coating 23a is made of a resin. The coating 23a covers an outer surface of the cladding 22a.

As illustrated in FIGS. 1A-1C, the coating 23a is removed in a vicinity of an end surface of the optical fiber 2a, and the coating 23b is removed in a vicinity of an end surface of the optical fiber 2b. Therefore, the cladding 22a is exposed in the vicinity of the end surface of the optical fiber 2a, and the cladding 22b is exposed in the vicinity of the end surface of the optical fiber 2b. The end surface of the optical fiber 2a and the end surface of the optical fiber 2b are fused together so that the cores 21a and 21b are optically coupled together and the claddings 22a and 22b are optically coupled together. As a result, a fusion-spliced point P is formed on an interface between the optical fibers 2a and 2b. In the thus fused optical fibers 2a and 2b, a section in which a part of the coating 23a and a part of the coating 23b, each of which parts are located in a vicinity of the fusion-spliced point P, are removed is referred to as a coating-removed section I (see FIGS. 1A and 1B).

(Reinforcement Member 3)

In one or more embodiments, the reinforcement member 3 is based on a rectangular parallelepiped-shaped block which has a pair of main surfaces facing each other. On the main surface 31, which is one of a pair of main surfaces of the reinforcement member 3, a groove 32 having a pair of side walls 321 and 322 and a bottom wall 323 which is parallel or substantially parallel to the main surface 31 is formed from the main surface 31 toward the inside of the reinforcement member 3. As illustrated in FIG. 1C, the widthwise cross-sectional shape of the groove 32 is a trapezoidal shape such that a distance between the side walls 321 and 322 (distance between a pair of walls) becomes greater in a direction away from the bottom wall 323. In a case where the optical fiber securing structure 1 is disposed as illustrated in FIG. 1C, the width of an opening formed in the main surface 31, which forms an upper base of the trapezoidal shape, is greater than the width of the bottom wall 323, which forms a lower base of the trapezoidal shape.

Note that, in one or more embodiments of the present invention, it is only necessary that the widthwise cross-sectional shape of a bottom part of the groove 32 which bottom part includes at least the bottom wall 323 be a trapezoidal shape.

In one or more embodiments, the reinforcement member 3 is made of alumina, which is an example of a non-transparent material. Alumina has a high thermal conductivity, a low linear expansion coefficient, and good processability, and is therefore suitable as a material of the reinforcement member 3.

The coating-removed section I of the optical fibers 2a and 2b is placed inside the groove 32 so as to be parallel or substantially parallel to the bottom wall 323 and be apart from the side walls 321 and 322 and the bottom wall 323 (see FIGS. 1B and 1C).

In the widthwise cross-sectional view, an angle which is formed by a normal to the main surface 31 or the bottom wall 323 and the side wall 321 is referred to as an inclination angle $\theta_1$, and an angle which is formed by a normal to the main surface 31 or the bottom wall 323 and the side wall 322 is referred to as an inclination angle $\theta_2$ (see FIG. 1C). The inclination angles $\theta_1$ and $\theta_2$ are examples of a first inclination angle and a second inclination angle. In one or more embodiments, as the inclination angles $\theta_1$ and $\theta_2$, an angle of $\theta_1=\theta_2=15$ degrees is employed. Therefore, an imaginary triangle 33 composed of (i) a base which is constituted by the opening that is formed in the main surface 31 and that corresponds to the groove 32 and (ii) two sides which are constituted by a line segment including the side wall 321 and a line segment including the side wall 322 is an isosceles triangle. The vertex angle $\theta_3$ of the imaginary triangle 33 is equal to the sum of the inclination angles $\theta_1$ and $\theta_2$, and is $\theta_3=30$ degrees in one or more embodiments. Note, however, that the inclination angles $\theta1$ and $\theta_2$ are each not limited to 15 degrees, and may differ from each other. In other words, the imaginary triangle 33 does not need to be an isosceles triangle. Note that, in one or more embodiments, the vertex angle $\theta_3$ and the sum of the inclination angles $\theta_1$ and $\theta_2$ are each not greater than 90 degrees, and may be not greater than 45 degrees.

(First Resin Members 4a and 4b)

As illustrated in FIG. 1C, each of the first resin members 4a and 4b is an aspect of a resin member which secures the coating-removed section I with respect to the side walls 321 and 322 and the bottom wall 323. Each of the first resin members 4a and 4b is formed by (i) injecting a resin material in a liquid state into the groove 32 inside which the coating-removed section I is placed in state where the coating-removed section I is apart from the side walls 321 and 322 and the bottom wall 323 and (ii) curing the resin material. The resin material which has been injected into the groove 32 is cured in a state where the resin material intervenes between the coating-removed section I and each of the side walls 321 and 322 and the bottom wall 323 from each of which the coating-removed section I is apart. Therefore, each of the first resin members 4a and 4b intervenes between the coating-removed section I and each of the side walls 321 and 322 and the bottom wall 323.

In one or more embodiments, the first resin members 4a and 4b are configured identically. Therefore, in one or more embodiments, the first resin members 4a and 4b are described while the first resin member 4a is taken as an example, and the first resin member 4b will be not described.

Out of interfaces which surround four sides of the first resin member 4a, an interface 41a which is an interface facing the bottom wall 323 is exposed in the opening formed in the main surface 31. Therefore, the interface 41a is an interface between the resin material of which the first resin member 4a is made and a gas phase (atmospheric air AT in one or more embodiments) (see FIG. 1C).

The resin material of which the first resin member 4a is made may be any resin material, provided that the resin material has flowability before being cured and is cured by being subjected to any treatment. In one or more embodiments, a thermosetting resin is used as the resin material of which the first resin member 4a is made. Examples of the resin material of which the first resin member 4a is made include, in addition to the thermosetting resin, an ultraviolet-curable resin and a two-liquid mixing curable resin. Note that the two-liquid mixing curable resin is a generic name of a resin which is made of a main agent and a curing agent and which is cured by mixing the main agent and the curing agent.

Note that the viscosity of the resin material, of which each of the first resin members 4a and 4b is made, before the resin material is cured (i.e., before the resin material is heated) is not limited to any particular one, and is, for example, not more than 5000 mPa·s in one or more embodiments.

Each of the first resin members 4a and 4b is only necessary to be formed at a position at which the each of the first resin members 4a and 4b secures at least a part of the coating-removed section I to the side walls 321 and 322 and the bottom wall 323. However, as illustrated in FIGS. 1A and 1B, each of the first resin members 4a and 4b may be formed at a position at which the each of the first resin members 4a and 4b secures, in addition to a part of the coating-removed section I, a part of a corresponding one of the coatings 23a and 23b to the side walls 321 and 322 and the bottom wall 323. This causes (i) the first resin member 4a to cover a boundary between the coating-removed section I and a section in which the coating 23a is present (hereinafter, the section is also referred to as a "coating section") and (ii) the first resin member 4b to cover a boundary between the coating-removed section I and a section in which the coating 23b is present (hereinafter, also referred to as a "coating section"). As a result, the following advantages are obtained. That is, an inner layer of the coating 23a is exposed on an end surface of the coating 23a, and an inner layer of the coating 23b is exposed on an end surface of the coating 23b. Thus, moisture which has entered the coating(s) 23a and/or 23b through the end surface(s) thereof penetrates into the coating(s) 23a and/or 23b and causes a change in property of a resin of which the coating(s) 23a and/or 23b are/is made. However, in a case where the first resin members 4a and 4b cover the respective boundaries between the coating-removed section I and the coating sections, it is possible to prevent moisture from entering the coatings 23a and 23b through the respective end surfaces thereof, and therefore the foregoing changes are unlikely to occur. Further, light which has been guided through each of the cladding 22a of the optical fiber 2a and the cladding 22b of the optical fiber 2b leaks concentratedly at a corresponding one of end parts of the coating-removed section I. Therefore, a local increase in temperature occurs at the corresponding one of the end parts of the coating-removed section I. However, in a case where the first resin members 4a and 4b cover the respective boundaries between the coating-removed section I and the coating sections, thermal conductivity at each of the end parts of the coating-removed section I is increased, and therefore the foregoing local increase is unlikely to occur.

The refractive index of the resin material of which each of the first resin members 4a and 4b is made can be selected as appropriate, depending on a use application of the optical fiber securing structure 1. In one or more embodiments, the optical fiber securing structure 1 has only a function of securing the coating-removed section I with respect to the groove 32, and does not have a function of a cladding mode stripper (described later). In one or more embodiments, the refractive index of the resin material of which each of the first resin members 4a and 4b is made may be lower than that of a glass material of which each of the claddings 22a and 22b, which is an outermost shell in the coating-removed section I, is made, in a state where the resin material is cured.

Figure 5:
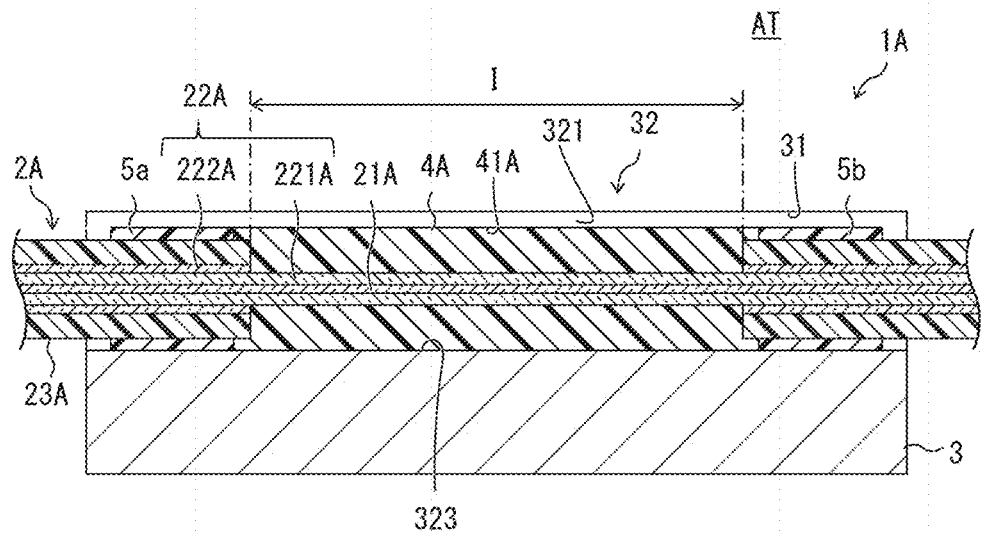
FIG. 5 is a longitudinal cross-sectional view of a variation of the optical fiber securing structure illustrated in FIGS. 1A-1C.

Note that, in one or more embodiments, as an aspect of the resin member, the first resin members 4a and 4b, which are two separated members, are employed. However, aspects of the resin member are not limited thereto. For example, a single resin member 4A may be alternatively employed as illustrated in FIG. 5, or three or more resin members may be alternatively employed.

(Second Resin Members 5a and 5b)

The second resin members 5a and 5b secure the coatings 23a and 23b, respectively, with respect to the side walls 321 and 322 and the bottom wall 323. Each of the second resin members 5a and 5b is formed by (i) injecting a resin material in a liquid state into the groove 32 inside which the coatings 23a and 23b are placed in a state where the coatings 23a and 23b are apart from the side walls 321 and 322 and the bottom wall 323 and (ii) curing the resin material. The resin material of which each of the second resin members 5a and 5b is made is not limited to any particular one, and can be selected as appropriate.

<Summary of Optical Fiber Securing Structure 1>

In the optical fiber securing structure 1 configured as has been described, the widthwise cross-sectional shape of the bottom part of the groove 32 which bottom part includes the bottom wall 323 is configured so as to be a trapezoidal shape such that the distance between the side walls 321 and 322 becomes greater in the direction away from the bottom wall 323.

Since the widthwise cross-sectional shape of at least the bottom part of the groove 32 is not a V shape as in the reinforcement structure illustrated in FIG. 1 of Patent Literature 1, but a trapezoidal shape, it is possible to make the thickness $T_1$ of the reinforcement member 3 thinner than that of a conventional reinforcement member. In the conventional reinforcement member, the thickness thereof is greater than the height $H_2$ of the imaginary triangle 33 illustrated in FIG. 1C. Therefore, it is possible to make the thickness $T_1$ of the reinforcement member 3 thinner, by at least a difference $\Delta$, than that of the conventional reinforcement member.

Note that, in one or more embodiments of the present invention, the cross-sectional shape of the groove 32 is only necessary to be a trapezoidal shape in the bottom part of the groove 32 which bottom part includes the bottom wall 323, and is not always necessary to be a trapezoidal shape in a region other than the bottom part. For example, in one or more embodiments of the groove 32, a protrusion which protrudes from at least any one of the side walls 321 and 322 may be formed in a region of the at least any one of the side walls 321 and 322 which region is apart from the bottom wall 323.

Furthermore, in one or more embodiments, the distance between the side walls 321 and 322 may become greater in the direction away from the bottom wall 323. In other words, the widthwise cross-sectional shape of the groove 32 may be a trapezoidal shape or a substantially trapezoidal shape throughout the entire region of the groove 32. According to this configuration, it is easy to cause a stress which each of the first resin members 4a and 4b can exert on the coating-removed section I to escape to the outside of the groove 32. Note that the trapezoidal shape means a shape in which each of the inclination angles $\theta_1$ and $\theta_2$ is constant as in the groove 32 illustrated in FIGS. 1A-1C. On the other hand, the substantially trapezoidal shape is a shape which has the side walls 321 and 322 corresponding to two legs as in the trapezoidal shape and in which at least any one of the inclination angles $\theta_1$ and $\theta_2$ is not constant.

Thus, in the optical fiber securing structure 1, it is possible to keep, at substantially the same level, the beam quality of a beam emitted from an end of the optical fiber 2a or 2b which end is opposite to the fusion-spliced point P, as compared with a conventional optical fiber securing structure.

As has been described, in one or more embodiments, the sum of the inclination angles $\theta_1$ and $\theta_2$ may be greater than 0 degree and not greater than 90 degrees, and may be greater than 0 degree and not greater than 45 degrees.

According to this configuration, when the resin material of which each of the first resin members 4a and 4b is made is injected into the groove 32, it is easy to inject the resin material into the groove 32 without causing the resin material to leak out of the groove 32, as compared with a case where the sum exceeds 90 degrees.

Note that the sum of the inclination angles $\theta_1$ and $\theta_2$ may be not greater than 45 degrees in one or more embodiments. According to this configuration, it is easier to inject the resin material into the groove 32 without causing the resin material to leak out of the groove 32. Moreover, it becomes easy to adjust the extent to which the resin material spreads in wet condition in a lengthwise direction of the groove 32.

Note also that, in the optical fiber securing structure 1 according to one or more embodiments, the coating-removed section I may be apart from each of the side walls 321 and 322 and the bottom wall 323 and each of the first resin members 4a and 4b intervenes between the coating-removed section I and each of the side walls 321 and 322 and the bottom wall 323.

In a case where the coating-removed section I is in contact with at least any one of the side walls 321 and 322 and the bottom wall 323, an outer surface of the coating-removed section I may be damaged in a time period until the coating-removed section I is secured to the side walls 321 and 322 and the bottom wall 323. A scratch formed on the outer surface of the coating-removed section I may cause a decrease in strength of the coating-removed section I. This can result in transmission failure in the optical fibers 2a and 2b. According to the optical fiber securing structure 1, the coating-removed section I is not in contact with any part of the groove 32. Therefore, in the optical fiber securing structure 1, it is possible to increase reliability of the coating-removed section I which is secured to the reinforcement member 3, i.e., reliability of each of the optical fibers 2a and 2b.

Further, in one or more embodiments, the interface 41a may be an interface between the resin material of which the first resin member 4a is made and the gas phase. Similarly, an interface 41b may be an interface between the resin material of which the first resin member 4b is made and the gas phase.

According to this configuration, the first resin members 4a and 4b disposed inside the groove 32 are not hermetically sealed, and are open to the gas phase (e.g., the atmospheric air). Therefore, in a case where each of the first resin members 4a and 4b increases or decreases in volume due to a change in temperature of an external environment, a change in volume of each of the first resin members 4a and 4b is not restricted from outside, as compared with a case where the first resin members 4a and 4b are hermetically sealed. Therefore, in the optical fiber securing structure 1, it is easy to cause a stress which results from the change in temperature of the external environment to escape to the outside of the groove 32. Therefore, in the optical fiber securing structure 1, it is possible to prevent a deterioration of the beam quality which deterioration can occur due to the change in temperature of the external environment.

Further, in one or more embodiments, the resin material of which each of the first resin members 4a and 4b is made may be a thermosetting resin.

As compared with an ultraviolet-curable resin or a two-liquid mixing curable resin, a thermosetting resin is a resin material a variety of products of which, having various properties, are distributed to a market. Therefore, according to the above configuration, it is easy to procure, from the market, a resin material which satisfies various requirements, as the resin material of which each of the first resin members 4a and 4b is made. Note that examples of the requirements with respect to the resin material of which each of the first resin members 4a and 4b is made includes the following requirements. That is, since the first resin members 4a and 4b cover the optical fibers 2a and 2b, respectively, each of which contains quartz as a main component, the resin material of which each of the first resin members 4a and 4b is made may be required to have a low refractive index of lower than 1.4. In addition, since high-power light which has leaked from each of the optical fibers 2a and 2b can enter a corresponding one of the first resin members 4a and 4b, the resin material of which each of the first resin members 4a and 4b is made may be required to have high transparency with respect to the wavelength of light which is guided through each of the optical fibers 2a and 2b and to have excellent heat resistance. Moreover, in order that lateral pressure which acts on each of the optical fibers 2a and 2b due to a change in volume of a corresponding one of the first resin members 4a and 4b is reduced, the resin material of which each of the first resin members 4a and 4b is made may be required to have a low Young's modulus.

Further, in one or more embodiments, the viscosity of the resin material of which each of the first resin members 4a and 4b is made may be not more than 5000 mPa·s, before the resin material is cured.

According to this configuration, it is easy to inject the resin material (resin material in a liquid state before being cured) into the groove 32 inside which the optical fibers 2a and 2b are disposed, as compared with a case where the viscosity of the resin material of which each of the first resin members 4a and 4b is made is more than 5000 mPa·s before the resin material is cured.

EXAMPLES

Examples of the optical fiber securing structure 1 illustrated in FIGS. 1A-1C are described below with reference to FIGS. 2 to 4.

FIG. 2 shows a photograph (upper), taken from above, and a cross-sectional view each illustrating spreading of the resin material in wet condition which was injected into the groove, in Example 1 of the optical fiber securing structure 1. In Example 1, as the inclination angles $\theta_1$ and $\theta_2$, an angle of $\theta_1=\theta_2=15$ degrees was employed. That is, as the vertex angle $\theta_3$, an angle of $\theta_3=30$ degrees was employed.

Figure 3:
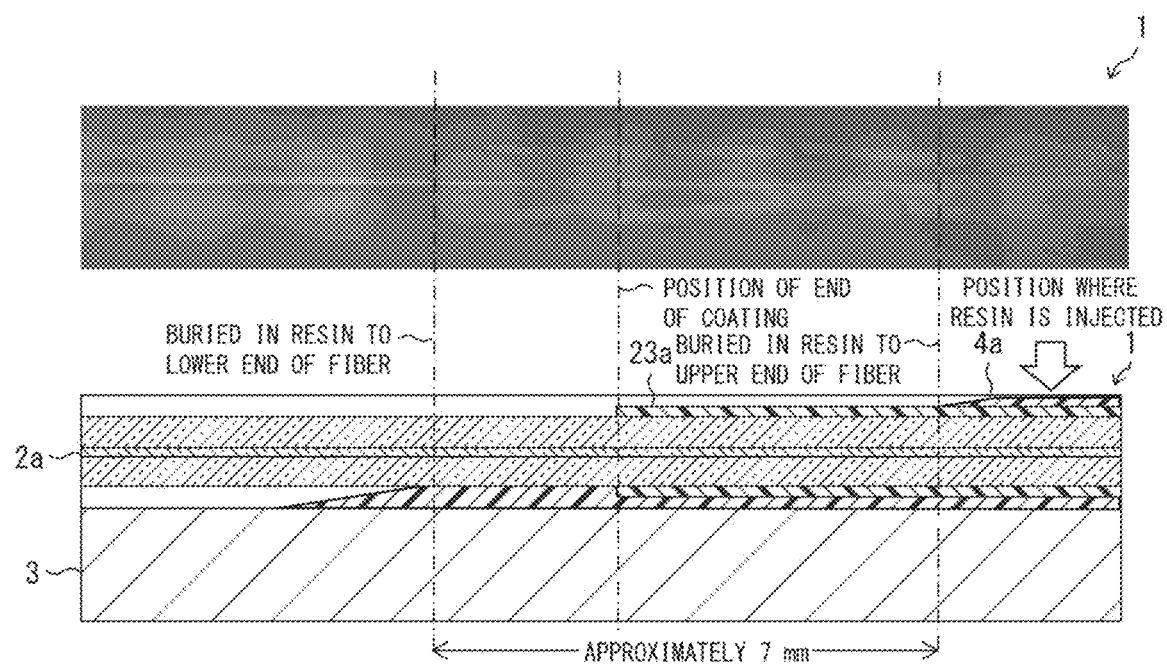
FIG. 3 shows a photograph (upper), taken from above, and a cross-sectional view each illustrating spreading of the resin material in wet condition which was injected into the groove, in Example 2 (the sum of the inclination angles of the side walls of the groove was set to 60 degrees) of the optical fiber securing structure illustrated in FIGS. 1A-1C.

FIG. 3 shows a photograph (upper), taken from above, and a cross-sectional view each illustrating spreading of the resin material in wet condition which was injected into the groove, in Example 2 of the optical fiber securing structure 1. In Example 2, as the inclination angles $\theta_1$ and $\theta_2$, an angle of $\theta_1=\theta_2=30$ degrees was employed. That is, as the vertex angle $\theta_3$, an angle of $\theta_3=60$ degrees was employed.

Figure 4:
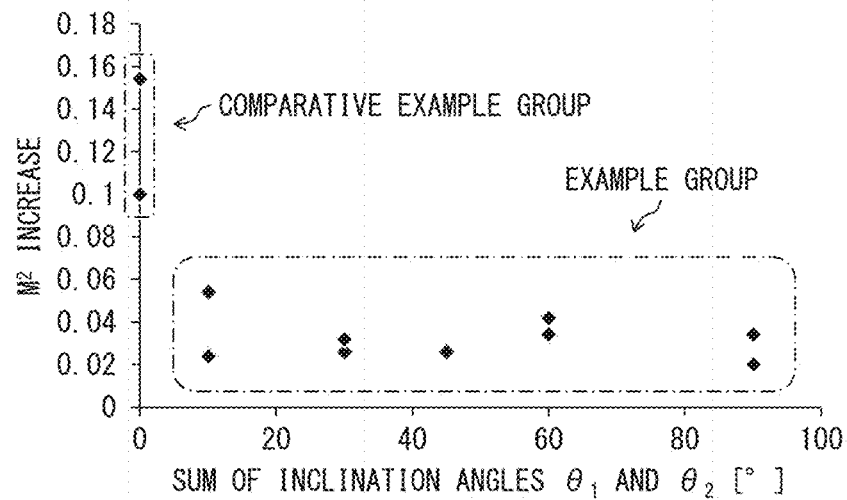
FIG. 4 is a graph showing, with regard to each of an Example group of the optical fiber securing structure illustrated in FIGS. 1A-1C and a Comparative Example group, the relationship between (i) an angle θ formed by the side walls of the groove inside which optical fibers were disposed and (ii) a beam quality ($M^2$ increase).

FIG. 4 is a graph showing, with regard to each of an Example group of the optical fiber securing structure 1 and a Comparative Example group, the relationship between (i) the sum of the inclination angles $\theta_1$ and $\theta_2$ (i.e., the vertex angle $\theta_3$) and (ii) the beam quality ($M^2$ increase). In the Example group of the optical fiber securing structure 1, the sum of the inclination angles $\theta_1$ and $\theta_2$ was varied within a range of not smaller than 10 degrees and not greater than 90 degrees. In the Comparative Example group of an optical fiber securing structure, a groove in which inclination angles $\theta_1$ and $\theta_2$ were each $\theta_1=\theta_2=0$ degree and the widthwise cross-sectional shape of which was a rectangular shape was employed as a groove which was formed in one of main surfaces of a reinforcement member and inside which optical fibers were to be disposed.

Each of FIGS. 2 and 3 illustrates a experimental result of examining the effect of the sum of the inclination angles $\theta_1$ and $\theta_2$ on spreading of the resin material in wet condition, with use of a corresponding one of Examples 1 and 2 in each of which a thermosetting resin having a viscosity of 5000 [mPa·s] before being cured was employed as the resin material of each of the first resin members 4a and 4b. In Example 1, the sum of the inclination angles $\theta_1$ and $\theta_2$ was set to 30 degrees, which is smaller than 45 degrees. This reduced the extent to which the resin material spread in wet condition in the lengthwise direction of the groove 32, so that an end part of the coating 23a could be covered by the resin material. In Example 2 illustrated in FIG. 3, the sum of the inclination angles $\theta_1$ and $\theta_2$ was set to 60 degrees, which is greater than 45 degrees. This increased the extent to which the resin material spread in wet condition in the lengthwise direction of the groove 32, so that the end part of the coating 23a could not be covered by the resin material.

With reference to FIG. 4, it was found that each optical fiber securing structure 1 in the Example group resulted in better beam quality than each optical fiber securing structure in the Comparative Example group.

(Variations)

An optical fiber securing structure 1A, which is a variation of the optical fiber securing structure 1 illustrated in FIGS. 1A-1C, is described below with reference to FIG. 5. FIG. 5 is a drawing corresponding to FIG. 1B illustrating the optical fiber securing structure 1, and is a longitudinal cross-sectional view of the optical fiber securing structure 1A. The optical fiber securing structure 1 described above is a securing structure in which a part of a coating-removed section of optical fibers which part includes a fusion-spliced point is secured to a reinforcement member, whereas the optical fiber securing structure 1A in accordance with the present variation is a securing structure in which a part of a coating-removed section of an optical fiber which part does not include a fusion-spliced point is secured to a reinforcement member.

The optical fiber securing structure 1A includes (1) an optical fiber 2A instead of the optical fibers 2a and 2b included in the optical fiber securing structure 1 and (2) a first resin member 4A instead of the first resin members 4a and 4b included in the optical fiber securing structure 1. Therefore, in the present variation, out of members included in the optical fiber securing structure 1A, the optical fiber 2A and the first resin member 4A will be described, and the other members will not be described. Note that, out of the members included in the optical fiber securing structure 1A, the members other than the optical fiber 2A and the first resin member 4A are denoted by the same reference numerals as those of the members included in the optical fiber securing structure 1.

Note that, in the optical fiber securing structure 1A, as the first resin member 4A for securing the optical fiber 2A to a groove 32 of a reinforcement member 3, a resin having a refractive index higher than that of an outermost shell (inner cladding 221A (described later)) of the optical fiber 2A in a coating-removed section I is employed. For this reason, the optical fiber securing structure 1A functions as a cladding mode stripper by, while securing the coating-removed section I to side walls 321 and 322 and a bottom wall 323, allowing light in a cladding mode which propagates through the inner cladding 221A to leak out of the inner cladding 221A.

(Optical Fiber 2A)

The optical fiber 2A includes a core 21A, a cladding 22A, and a coating 23. The cladding 22A is constituted by the inner cladding 221A which covers a side surface of the core 21A and an outer cladding 222A which covers an outer surface of the inner cladding 221A. That is, the optical fiber 2A is a double-cladding fiber.

In the optical fiber 2A, the core 21A and the inner cladding 221A are each made of glass containing quartz as a main component. To at least any one of the core 21A and the inner cladding 221A, a dopant is added as appropriate. This is to cause the refractive index of the core 21A to be higher than that of the inner cladding 221A. In the optical fiber 2A of the present variation, the outer cladding 222A and the coating 23A are each made of a resin. As a resin material of the outer cladding 222A, a resin material having a refractive index lower than that of the inner cladding 221A is selected.

As illustrated in FIG. 5, in the coating-removed section I, which is a partial section of the optical fiber 2A, the outer cladding 222A and the coating 23A are removed. Therefore, in the coating-removed section I, the inner cladding 221A is exposed.

(First Resin Member 4A)

As illustrated in FIG. 5, the first resin member 4A is an aspect of a resin member which secures the coating-removed section I with respect to the side walls 321 and 322 and the bottom wall 323 of the groove 32. Similarly to the first resin members 4a and 4b, the first resin member 4A is formed by (i) injecting a resin material in a liquid state into the groove 32 inside which the coating-removed section I is placed in a state where the coating-removed section I is apart from the side walls 321 and 322 and the bottom wall 323 and (ii) curing the resin material.

That is, a method of producing the optical fiber securing structure 1 includes the steps of: placing the coating-removed section I inside the groove 32 in a state where the coating-removed section I is apart from the side walls 321 and 322 and the bottom wall 323; injecting the resin material in a liquid state into the groove 32 inside which the coating-removed section I is placed; and curing the resin material which has been injected into the groove 32.

The resin material which has been injected into the groove 32 is cured in a state where the resin material intervenes between the coating-removed section I and each of the side walls 321 and 322 and the bottom wall 323 from each of which the coating-removed section I is apart. Therefore, the first resin member 4A intervenes between the coating-removed section I and each of the side walls 321 and 322 and the bottom wall 323.

Note that, in the present variation, the first resin member 4A covers the outer surface of the inner cladding 221A throughout the entire coating-removed section I.

The first resin member 4A differs from the first resin members 4a and 4b in terms of a refractive index in a state where the resin material is cured. More specifically, the resin material of which the first resin member 4A is made is configured such that, in a state where the resin material is cured, the refractive index of the resin material is equal to or higher than the refractive index of a glass material of which the inner cladding 221A, which is the outermost shell in the coating-removed section I, is made.

According to this configuration, the optical fiber securing structure 1A functions as a cladding mode stripper. Therefore, the optical fiber securing structure 1A can provide a cladding mode stripper in which, as compared with a conventional structure, it is possible to suppress the thickness of a reinforcement member while keeping, at substantially the same level, the beam quality of a beam emitted from an optical fiber.

The resin material of which the first resin member 4A is made is configured similarly to the resin material of which each of the first resin members 4a and 4b is made, except for the foregoing difference in refractive index.

Out of interfaces which surround four sides of the first resin member 4A, an interface 41A which is an interface facing the bottom wall 323 is exposed in an opening formed in a main surface 31. Therefore, the interface 41A is an interface between the resin material of which the first resin member 4A is made and a gas phase (atmospheric air AT in the present variation).

Figure 6:
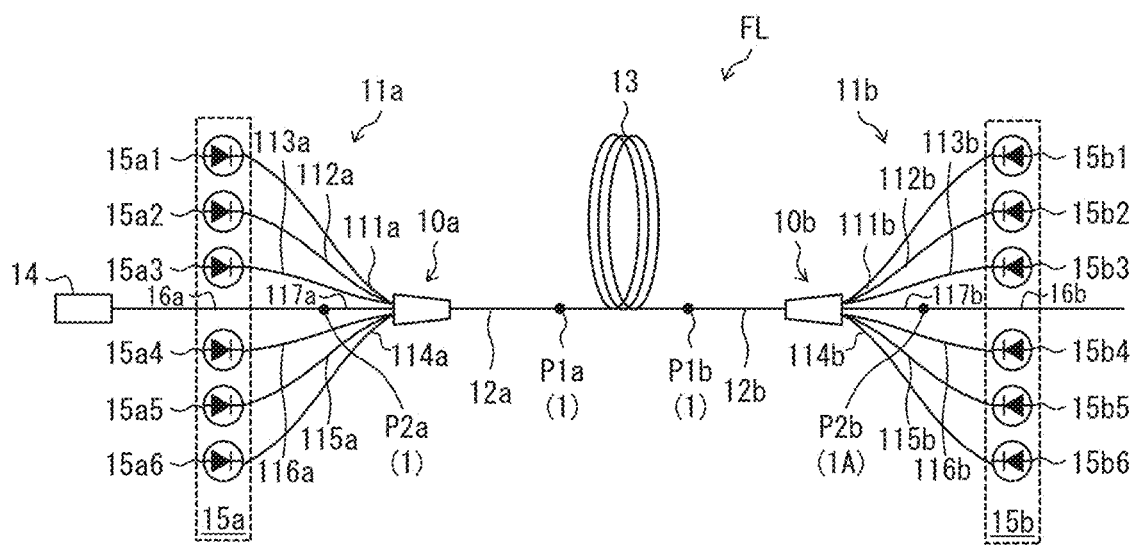
FIG. 6 is a block diagram of a fiber laser in accordance with one or more embodiments of the present invention.
Figure 7:
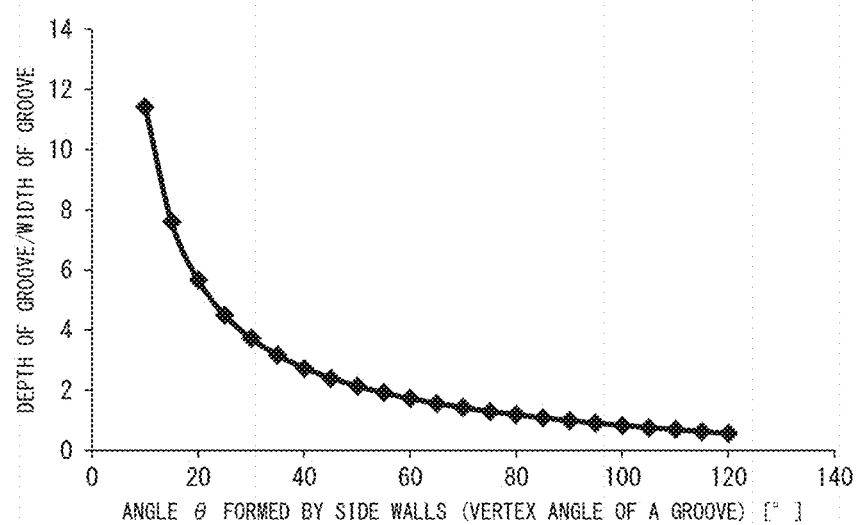
FIG. 7 is a graph showing, with regard to a conventional optical fiber securing structure, the relationship between (i) an angle θ formed by side walls of a groove inside which an optical fiber is disposed and (ii) a ratio of the depth of the groove to the width of the groove.

The following description will discuss a fiber laser FL (example of a laser device) in accordance with one or more embodiments of the present invention, with reference to FIG. 6. FIG. 6 is a block diagram of the fiber laser FL.

As illustrated in FIG. 6, the fiber laser FL includes optical combiners 10a and 10b, a gain fiber 13, a seed light source 14, pumping light source groups 15a and 15b, and delivery fibers 16a and 16b. The fiber laser FL is a laser of an MOPA (Master Oscillator-Power Amplifier) type. That is, the seed light source 14 functions as a master oscillator (MO), and the optical combiners 10a and 10b, the gain fiber 13, and the pumping light source groups 15a and 15b function as a power amplifier (PA).

The optical combiners 10a and 10b are configured identically. As illustrated in FIG. 6, the optical combiner 10a includes (i) an optical fiber bundle 11a which is a bundle of seven first optical fibers 111a to 117a and (ii) a second optical fiber 12a, and the optical combiner 10b includes (i) an optical fiber bundle 11b which is a bundle of seven first optical fibers 111b to 117b and (ii) a second optical fiber 12b.

In one or more embodiments, each of the second optical fibers 12a and 12b is a double-cladding fiber. To an end surface of each of the second optical fibers 12a and 12b which end surface is located on a gain fiber 13 side (the gain fiber 13 will be described later), a corresponding one of end surfaces of the gain fiber 13, which is a double-cladding fiber, is fused. Therefore, a fusion-spliced point P1a is formed on an interface between the second optical fiber 12a and the gain fiber 13, a fusion-spliced point P1b is formed on an interface between the second optical fiber 12b and the gain fiber 13.

The first optical fibers 111a to 116a correspond to pumping light sources 15a1 to 15a6 (described later), respectively, and the first optical fibers 111b to 116b correspond to pumping light sources 15b1 to 15b6 (described later), respectively. The first optical fibers 111a to 116a and 111b to 116b are configured identically. Therefore, in one or more embodiments, the first optical fibers 111a to 116a and 111b to 116b are described while the first optical fiber 111a is taken as an example, and the first optical fibers 112a to 116a and 111b to 116b will be not described.

An end surface of the first optical fiber 111a which end surface is located on a pumping light source 15a1 side is optically coupled to the pumping light source 15a1. Therefore, pumping light which has been generated by the pumping light source 15a1 is guided through the first optical fiber 111a.

The first optical fiber 117a has an end surface which is fused to an end surface of the delivery fiber 16a that is optically coupled to the seed light source 14 (described later). Therefore, a fusion-spliced point P2a is formed on an interface between the first optical fiber 117a and the delivery fiber 16a. As a result, seed light which has been generated by the seed light source 14 is guided through the first optical fiber 117a.

The first optical fiber 117b has an end surface which is fused to an end surface of the delivery fiber 16b (described later). Therefore, a fusion-spliced point P2b is formed on an interface between the first optical fiber 117b and the delivery fiber 16b. High-power laser light which has been amplified by the gain fiber 13 is guided through the first optical fiber 117b.

In the optical combiner 10a, (1) an end surface of the first optical fiber 117a which end surface is located on a second optical fiber 12a side is fused to a core of the second optical fiber 12a and (2) an end surface of each of the first optical fibers 111a to 116a which end surface is located on the second optical fiber 12a side is fused to an inner cladding of the second optical fiber 12a. Similarly, in the optical combiner 10b, (1) an end surface of the first optical fiber 117b which end surface is located on a second optical fiber 12b side is fused to a core of the second optical fiber 12b and (2) an end surface of each of the first optical fibers 111b to 116b which end surface is located on the second optical fiber 12b side is fused to an inner cladding of the second optical fiber 12b. Therefore, seed light which has been generated by the seed light source 14 is guided through the core of the second optical fiber 12a, and pumping light which has been generated by each of the pumping light sources 15a1 to 15a6 is guided through the inner cladding of the second optical fiber 12a. High-power laser light which has been amplified by the gain fiber 13 is guided through the core of the second optical fiber 12b, and pumping light which has been generated by each of the pumping light sources 15b1 to 15b6 is guided through the inner cladding of the second optical fiber 12b.

The gain fiber 13 is an optical fiber which is for amplification and which has a function of amplifying seed light with use of energy of pumping light and generating high-power laser light. Note that, in one or more embodiments, a double-cladding fiber which includes a core doped with a rare earth element is used as the gain fiber 13. Note, however, the gain fiber 13 is not limited to the double-cladding fiber. That is, any optical fiber can be used as the gain fiber 13, provided that the any optical fiber includes a waveguide (corresponding to a core) through which laser light is guided and a waveguide (corresponding to a cladding) through which pumping light is guided. Note also that, in one or more embodiments, ytterbium is used as the rare earth element with which the core is doped. Note, however, that the rare earth element with which the core is doped is not limited to ytterbium. For example, the core may be doped with any rare earth element other than ytterbium, such as thulium, cerium, neodymium, europium, or erbium.

The seed light source 14, which is the master oscillator, is a laser light source which generates seed light to be amplified by the gain fiber 13 (described later). The laser light source which is employed as the seed light source 14 is not limited to any particular aspect, and may be, for example, a fiber laser of a resonator type or any of a semiconductor laser, a solid laser, a liquid laser, and a gas laser.

The pumping light source group 15a is constituted by the pumping light sources 15a1 to 15a6, and the pumping light source group 15b is constituted by the pumping light sources 15b1 to 15b6. The pumping light sources 15a1 to 15a6 and 15b1 to 15b6 each generate pumping light to be supplied to the gain fiber 13. A laser light source which is employed as each of the pumping light source 15a1 to 15a6 and 15b1 to 15b6 is not limited to any particular one, provided that the laser light source is capable of generating light which enables a transition of the rare earth element, with which the core of the gain fiber 13 is doped, to a population inversion state. One or more embodiments of the laser light source may be, for example, a fiber laser of a resonator type or any of a semiconductor laser, a solid laser, a liquid laser, and a gas laser. In one or more embodiments, as an aspect of the laser light source which constitutes each of the pumping light sources 15a1 to 15a6 and 15b1 to 15b6, a semiconductor laser is employed.

In one or more embodiments, a few-mode fiber is employed as each of the delivery fibers 16a and 16b. Note, however, that each of the delivery fibers 16a and 16b is not limited to the few-mode fiber. That is, a single-mode fiber or a multimode fiber other than the few-mode fiber can be employed as each of the delivery fibers 16a and 16b, provided that the single-mode fiber or the multimode fiber is an optical fiber which allows seed light which has been outputted from the seed light source 14 and output light which has been amplified by the gain fiber 13 to be guided therethrough. Note that the few-mode fiber indicates, among multimode fibers (optical fibers having two or more guide modes), an optical fiber having 25 or less guide modes.

To the seed light source 14, one of ends of the delivery fiber 16a is connected. To the other of the ends of the delivery fiber 16a, the first optical fiber 117a of the optical combiner 10a is connected. To the pumping light sources 15a1 to 15a6 of the pumping light source group 15a, the first optical fibers 111a to 116a of the optical combiner 10a are respectively connected. To the second optical fiber 12a of the optical combiner 10a, one of ends of the gain fiber 13 is fused.

To one of ends of the delivery fiber 16b, an output head (not illustrated in FIG. 6) is connected. To the other of the ends of the delivery fiber 16b, the first optical fiber 117b of the optical combiner 10b is connected. To the pumping light sources 15b1 to 15b6 of the pumping light source group 15b, the first optical fibers 111b to 116b of the optical combiner 10b are respectively connected. To the second optical fiber 12b of the optical combiner 10b, the other of the ends of the gain fiber 13 is fused.

The first optical fibers 111a to 116a of the optical combiner 10a and the first optical fibers 111b to 116b of the optical combiner 10b each function as a pumping-light-source port. The first optical fiber 117a of the optical combiner 10a functions as a seed-light-source port. The first optical fiber 117b of the optical combiner 10b functions as an output-head port. The second optical fiber 12a of the optical combiner 10a and the second optical fiber 12b of the optical combiner 10b each function as a gain-fiber port.

Note that, in one or more embodiments, the fiber laser FL is realized as a fiber laser of a bidirectional pumping type which includes the pumping light source group 15a and the pumping light source group 15b. However, the present invention is not limited to such a configuration. That is, the fiber laser FL can be alternatively realized as a fiber laser of a unidirectional pumping type which includes only the pumping light source group 15a or can be alternatively realized as a fiber laser of a unidirectional pumping type which includes only the pumping light source group 15b.

A fiber laser system which includes a plurality of fiber lasers FL is also included in the scope of the present invention. The fiber laser system is capable of generating laser light which has power higher than that of laser light generated by the fiber laser FL, by coupling laser light generated by each of the plurality of fiber lasers FL.

(Application of Optical Fiber Securing Structure 1 and Optical Fiber Securing Structure 1A)

As illustrated in FIG. 6, the foregoing fiber laser FL includes the fusion-spliced points P1a, P1b, P2a, and P2b.

As a structure of each of the fusion-spliced points P1a, P1b, and P2a, an optical fiber securing structure is suitably employed which is a variation of the optical fiber securing structure 1 illustrated in FIGS. 1A-1C and in which a double-cladding fiber is employed, instead of a single-cladding fiber, as each of the optical fibers 2a and 2b. According to this configuration, it is possible to make the thickness of a reinforcement member thinner than that of a conventional reinforcement member. Furthermore, according to this configuration, it is possible to keep, at substantially the same level as in a conventional configuration, the beam quality of a beam emitted from the optical fiber which is located on a downstream side of each of the fusion-spliced points P1a, P1b, and P2a. Therefore, in the fiber laser FL, it is possible to reduce a space occupied by the reinforcement member in a device, while keeping the beam quality of generated laser light at substantially the same level as in a conventional configuration.

As a structure of the fusion-spliced point P2b, a variation of the optical fiber securing structure 1A illustrated in FIG. 5, which variation is described below, can be suitably employed. The variation of the optical fiber securing structure 1A is based on the optical fiber securing structure 1A, and is obtained by replacing the optical fiber 2A included in the optical fiber securing structure 1A with two optical fibers as in the optical fiber securing structure 1 illustrated in FIGS. 1A-1C. Note that, in the optical fiber securing structure 1, a single-cladding fiber was employed as each of the optical fibers 2a and 2b. However, in the variation of the optical fiber securing structure 1A, a double-cladding fiber is employed as each of the two optical fibers corresponding to the optical fibers 2a and 2b. Thus, in a coating-removed section I of the variation of the optical fiber securing structure 1A, the fusion-spliced point P2b, corresponding to the fusion-spliced point P in the optical fiber securing structure 1, is formed.

According to this configuration, it is possible to make the thickness of a reinforcement member thinner than that of a conventional reinforcement member. Furthermore, according to this configuration, it is possible to keep, at substantially the same level as in a conventional configuration, the beam quality of high-power laser light which is emitted from the delivery fiber 16b. Therefore, in the fiber laser FL, it is possible to reduce a space occupied by the reinforcement member in a device, while keeping the beam quality of generated laser light at substantially the same level as in a conventional configuration. In particular, since the optical fiber securing structure 1A functions as a cladding mode stripper as described above, it is possible to increase the beam quality of high-power laser light, as compared with a case where the optical fiber securing structure 1 is employed as the structure of the fusion-spliced point P2b.

Note that, in a case where the power of high-power laser light is prioritized over the beam quality, it is also possible to employ the optical fiber securing structure 1 as the structure of the fusion-spliced point P2b. The optical fiber securing structure 1 can also be suitably employed for each of the optical combiners 10a and 10b.

The following description will discuss, in detail, an optical combiner 101 in accordance with one or more embodiments of the present invention, with reference to FIGS. 8 to 12. In FIGS. 8 to 12, the same or corresponding constituent elements are denoted by the same reference numerals, and duplicate descriptions are omitted. In FIGS. 8 to 12, the scale and/or the dimensions of each constituent element may be exaggerated. Further, in FIGS. 8 to 12, some constituent elements may be omitted. In the following description, unless otherwise specified, terms such as "first" and "second" are only used to distinguish constituent elements from one another, and do not represent a particular rank or order. In one or more embodiments, the optical combiner 101 is an aspect of an optical fiber securing structure.

Figure 8:
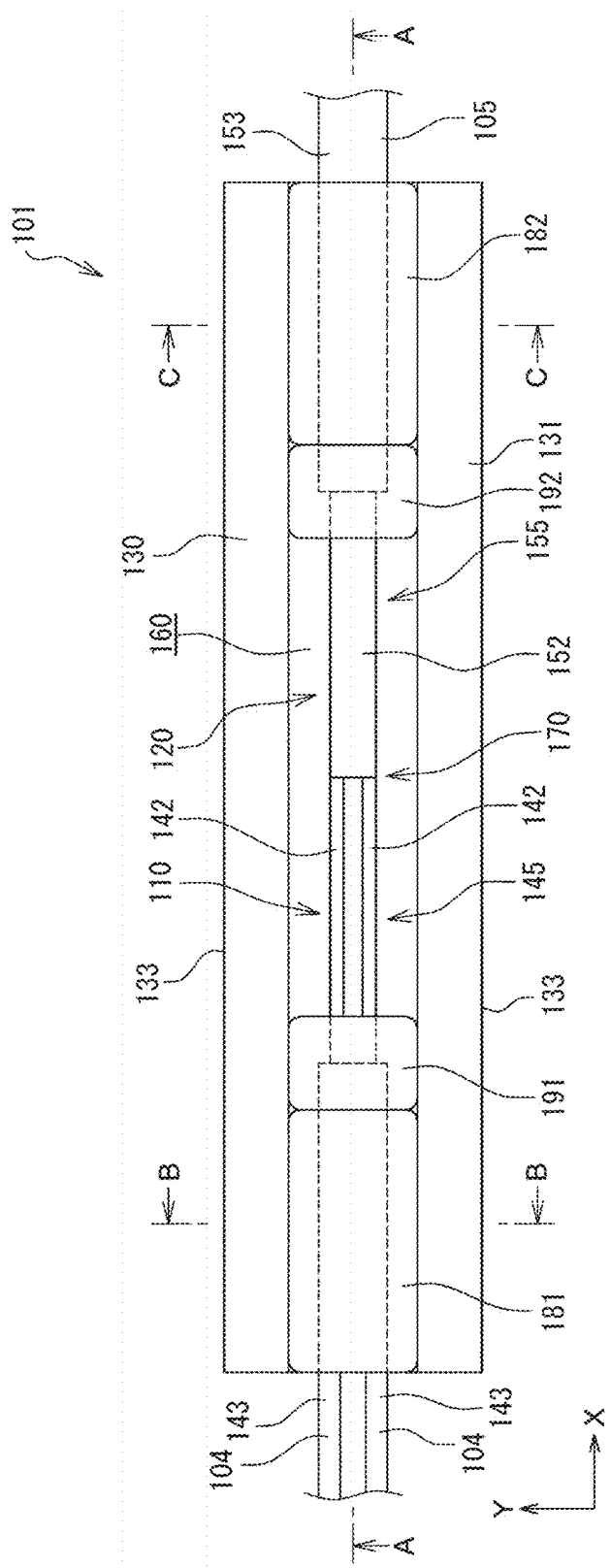
FIG. 8 is a plan view schematically illustrating an optical combiner in accordance with one or more embodiments of the present invention.
Figure 9:
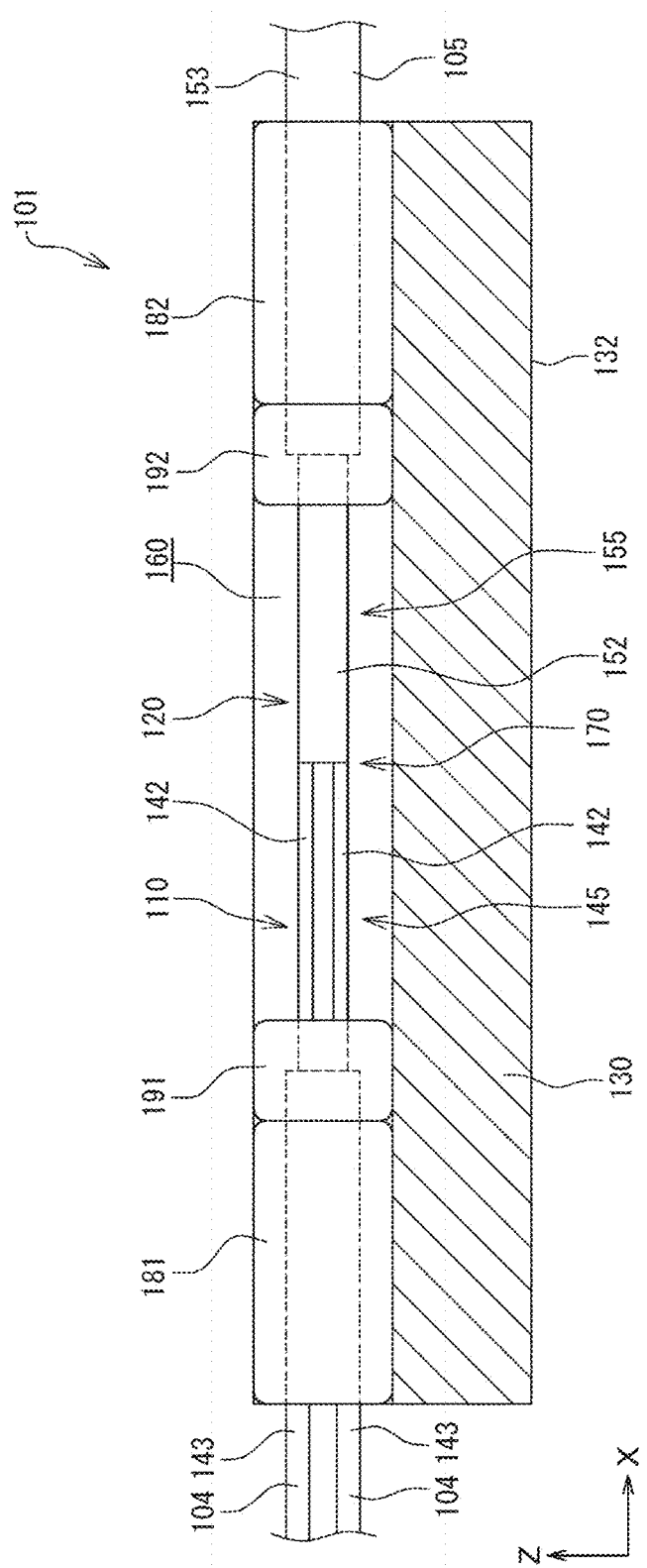
FIG. 9 is a cross-sectional view of the optical combiner illustrated in FIG. 8, taken along a line A-A.
Figure 10:
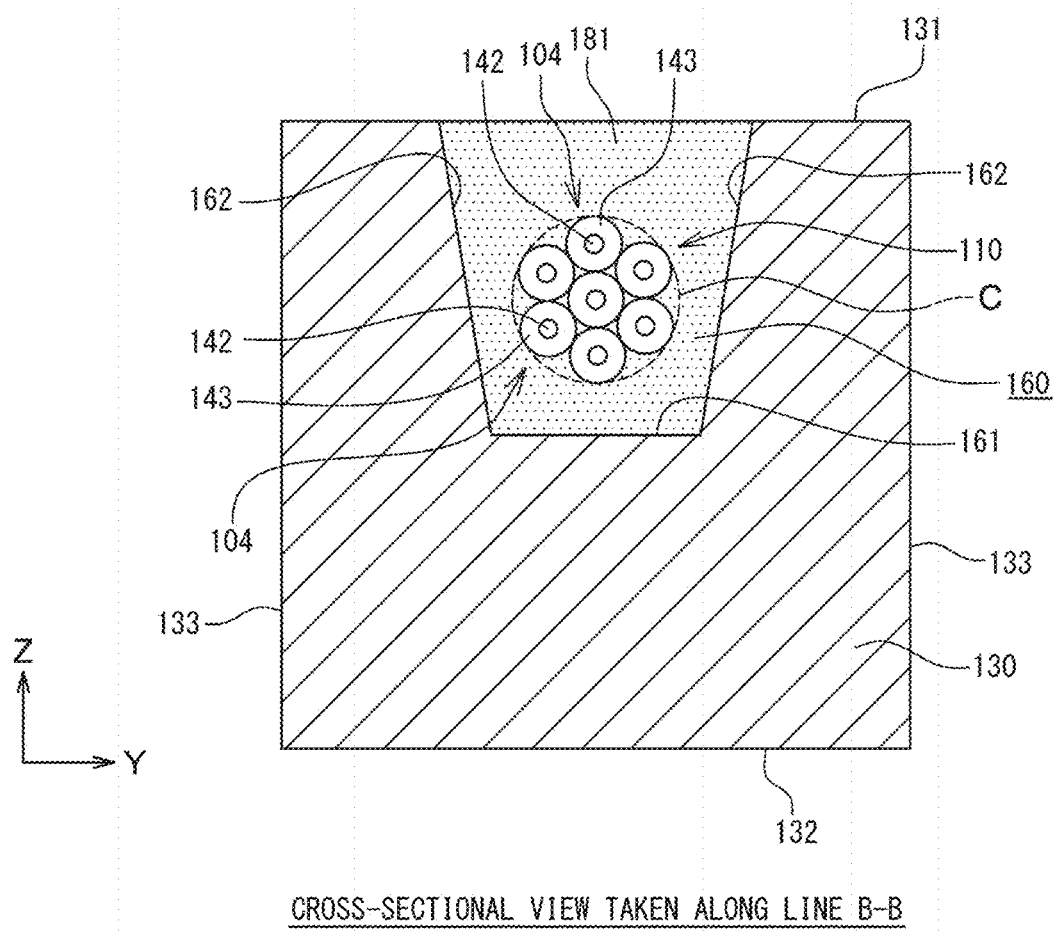
FIG. 10 is a cross-sectional view of the optical combiner illustrated in FIG. 8, taken along a line B-B.
Figure 11:
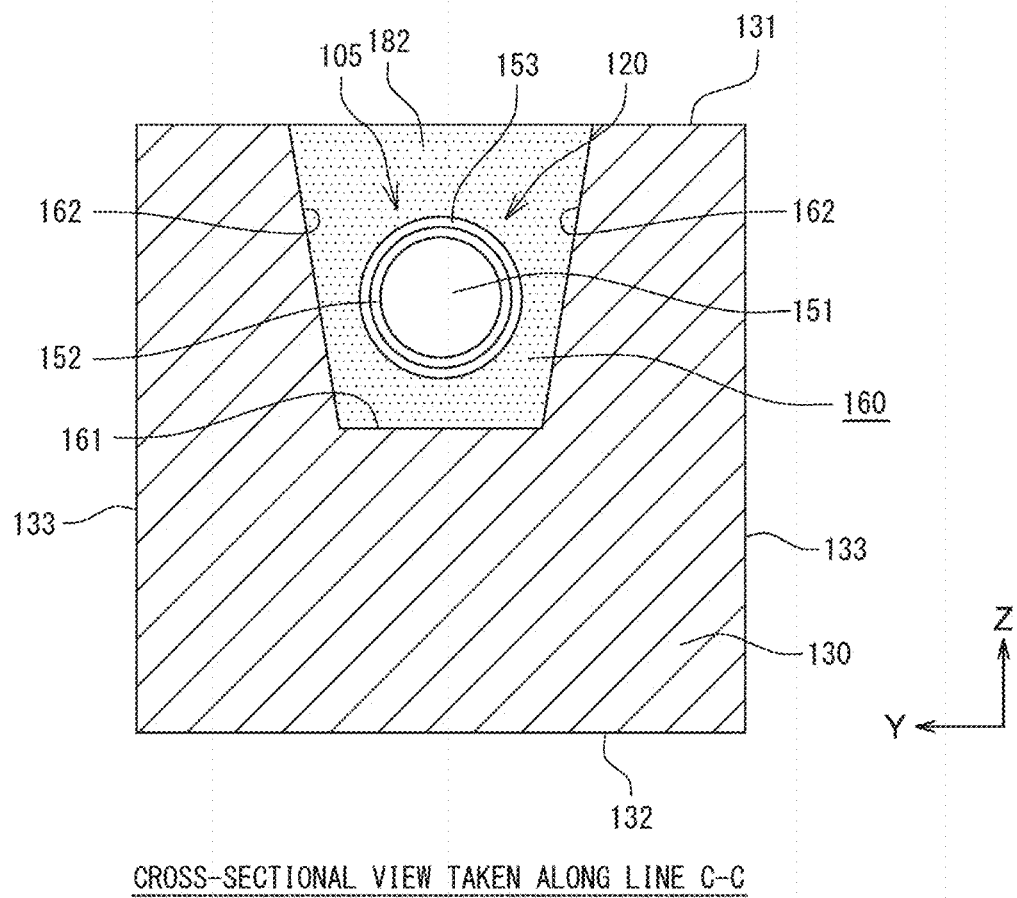
FIG. 11 is a cross-sectional view of the optical combiner illustrated in FIG. 8, taken along a line C-C.

FIG. 8 is a plan view schematically illustrating the optical combiner 101. FIG. 9 is a cross-sectional view of the optical combiner 101, taken along a line A-A. FIG. 10 is a cross-sectional view of the optical combiner 101, taken along a line B-B. FIG. 11 is a cross-sectional view of the optical combiner, taken along a line C-C. Note that the line A-A, the line B-B, and the line C-C are illustrated in FIG. 8. As illustrated in FIGS. 8 to 11, the optical combiner 101 includes: a first optical fiber unit 110 which is obtained by bundling a plurality of optical fibers 104 (first optical fibers); a second optical fiber unit 120 which is constituted by a single optical fiber 5 (second optical fiber); and a reinforcement member 130 which protects the first optical fiber unit 110 and the second optical fiber unit 120 from an external force, an impact, and a vibration. Note that although the second optical fiber unit 120 in one or more embodiments includes the single optical fiber 5, the second optical fiber unit 120 may include a plurality of optical fibers.

As illustrated in FIG. 10, the first optical fiber unit 110 in one or more embodiments is constituted by seven optical fibers 104. Each of the optical fibers 104 includes a core (not illustrated), a cladding 142 which surrounds the core, and a coating 143 which surrounds the cladding 142. The refractive index of the cladding 142 is lower than that of the core, and light propagates inside the core. The coating 143 is made of, for example, a resin. At an end part of each of the optical fibers 104, a part of the coating 143 is removed throughout a certain length in a lengthwise direction (X direction), and a coating-removed part 145 in which the cladding 142 is exposed is formed (see FIGS. 8 and 9).

As illustrated in FIG. 11, the optical fiber 5 which constitutes the second optical fiber unit 120 includes a core 151, a cladding 152 which surrounds the core 151, and a coating 153 which surrounds the cladding 152. The refractive index of the cladding 152 is lower than that of the core 151, and light propagates inside the core 151. The coating 153 is made of, for example, a resin. At an end part of the optical fiber 5, a part of the coating 153 is removed throughout a certain length in the lengthwise direction (X direction), and a coating-removed part 155 in which the cladding 152 is exposed is formed (see FIGS. 8 and 9).

The coating-removed part 145 of each of the optical fibers 104 of the first optical fiber unit 110 and the coating-removed part 155 of the optical fiber 5 of the second optical fiber unit 120 are fusion-spliced together at a fusion-spliced part 170. That is, the coating-removed parts 145 and 155 are fusion-spliced together so that the core of each of the plurality of optical fibers 104 of the first optical fiber unit 110 and the core 151 of the optical fiber 5 of the second optical fiber unit 120 are optically coupled together. This causes light which propagates through the core of each of the plurality of optical fibers 104 of the first optical fiber unit 110 to be introduced into the core 151 of the optical fiber 5 of the second optical fiber unit 120.

As illustrated in FIGS. 8 to 11, the reinforcement member 130 has an upper surface 131 (first surface), a lower surface 132 (second surface), and two side surfaces 133 via which the upper surface 131 and the lower surface 132 are connected to each other. Each of the upper surface 131, the lower surface 132, and the side surfaces 133 extends in the lengthwise direction. In the upper surface 131 of the reinforcement member 130, a fiber groove 160 which extends in the lengthwise direction is formed. Inside the fiber groove 160, the first optical fiber unit 110 and the second optical fiber unit 120 described above are accommodated in a state of being fusion-spliced together at the fusion-spliced part 170. This reinforcement member 130 can be made of a glass material such as, for example, Neoceram (trademark) or quartz. Note that a lid (not illustrated) is disposed on the upper surface 131 of the reinforcement member 130 so that the fiber groove 160 is protected from dust. Since the coating-removed parts 145 of the optical fibers 104, the coating-removed part 155 of the optical fiber 105, and the fusion-spliced part 170, all of which are particularly susceptible to an external force, are thus accommodated inside the fiber groove 160 of the reinforcement member 130, these parts are protected from an external force, an impact, and a vibration.

As illustrated in FIGS. 8 and 9, the optical fibers 104 of the first optical fiber unit 110 are secured inside the fiber groove 160 by a securing resin 181 disposed inside one of end parts of the fiber groove 160 in the X direction. As illustrated in FIG. 10, the securing resin 181 covers the entire outer circumference of the coating 143 of each of the optical fibers 104. Further, as illustrated in FIGS. 8 and 9, the optical fiber 5 of the second optical fiber unit 120 is secured inside the fiber groove 160 by a securing resin 182 disposed inside the other of the end parts of the fiber groove 160 in the X direction. As illustrated in FIG. 11, the securing resin 182 covers the entire outer circumference of the coating 153 of the optical fiber 5. As each of the securing resins 181 and 182, a UV curable resin can be, for example, employed.

At a boundary part between the coating-removed part 145 and the coating 143 of each of the optical fibers 104 of the first optical fiber unit 110, a refractive-index-adjusted resin 191 is disposed which covers a part of the coating-removed part 145 (a part of the cladding 142) and a part of the coating 143. Similarly, at a boundary part between the coating-removed part 155 and the coating 153 of the optical fiber 5 of the second optical fiber unit 120, a refractive-index-adjusted resin 192 is disposed which covers a part of the coating-removed part 155 (a part of the cladding 152) and a part of the coating 153.

In a case where light which propagates through the core of each of the optical fibers 104 leaks to the cladding 142 and further leaks from the cladding 142, there is a possibility that the light which has leaked is absorbed by a foreign matter adhering to the coating-removed part 145 or by the coating 143 and consequently heat is generated. In a case where light which propagates through the core 151 of the optical fiber 5 leaks to the cladding 152 and further leaks from the cladding 152, there is a possibility that the light which has leaked is absorbed by a foreign matter adhering to the coating-removed part 155 or by the coating 153 and consequently heat is generated. Therefore, in one or more embodiments, the amount of light which leaks from the cladding 142 to the refractive-index-adjusted resin 191 is controlled by adjusting the refractive index of the refractive-index-adjusted resin 191, and the amount of light which leaks from the cladding 152 to the refractive-index-adjusted resin 192 is controlled by adjusting the refractive index of the refractive-index-adjusted resin 192. Note that such refractive-index-adjusted resins 191 and 192 are not necessarily required.

Figure 12:
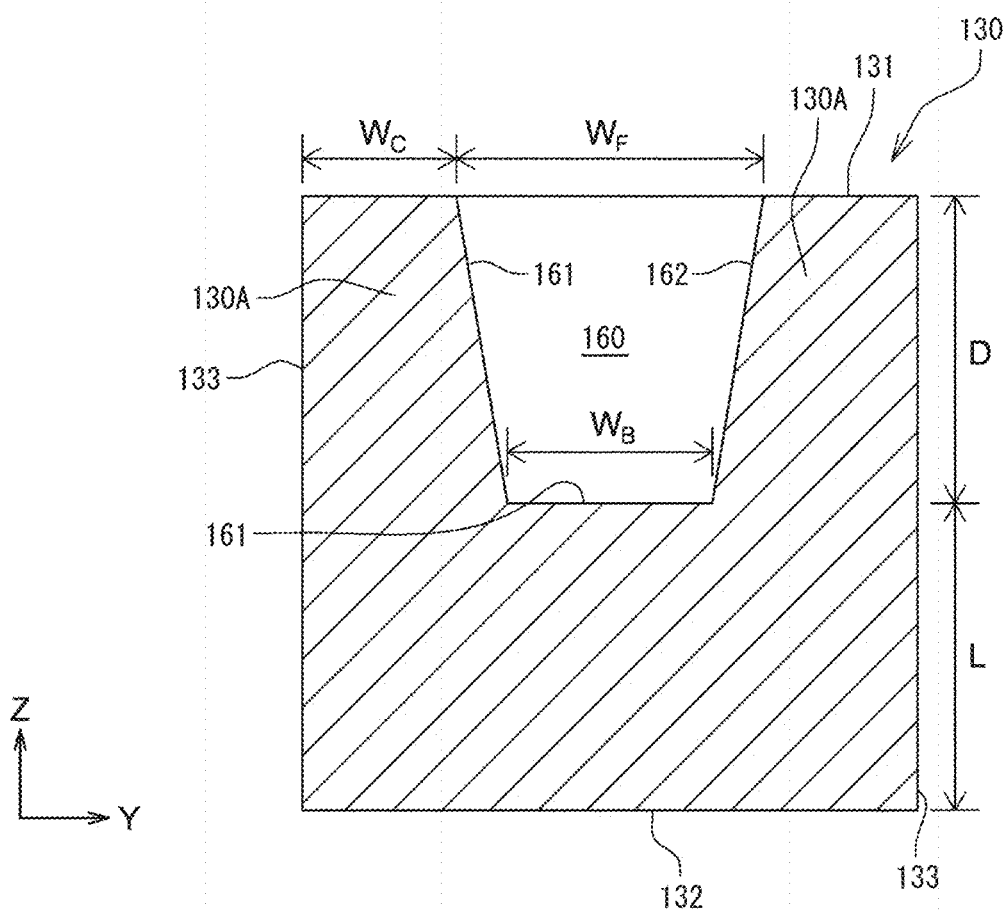
FIG. 12 is a cross-sectional view of a reinforcement member of the optical combiner illustrated in FIG. 8 in a case where the reinforcement member is cut along a plane perpendicular to a lengthwise direction.

FIG. 12 is a cross-sectional view of the reinforcement member 130 in a case where the reinforcement member 130 is cut along a plane (YZ plane) perpendicular to the lengthwise direction. As illustrated in FIG. 12, the fiber groove 160 of the reinforcement member 130 is formed as a groove the cross-sectional shape of which is a substantially trapezoidal shape, and has a bottom surface 161 which has a width $W_B$ in a Y direction and a pair of side walls 162 each of which extends from the bottom surface 161 toward the upper surface 131 in a state of being inclined. The bottom surface 161 is located at a given depth D in a −Z direction from the upper surface 131 of the reinforcement member 130. The pair of side walls 162 are shaped such that a distance between the side walls 162 gradually becomes greater in a +Z direction from the bottom surface 161, and the width $W_F$ of an opening of the fiber groove 160 in the Y direction, which opening is formed in the upper surface 131, is greater than the width $W_B$ of the bottom surface 161, and is, for example, not more than 1.5 times as great as the width $W_B$.

The width $W_B$ of the bottom surface 161 is greater than the diameter $d_1$ of a minimum circle C (see FIG. 10) which encloses all of the coatings 143 of the optical fibers 104 of the first optical fiber unit 110 (hereinafter, the diameter may be referred to as a coating enclosing diameter $d_1$). The width $W_B$ of the bottom surface 161 can be, for example, not more than 2.5 times as great as the diameter $d_1$. The width $W_B$ of the bottom surface 161 is greater than the outer diameter $d_2$ of the coating 153 of the optical fiber 5 of the second optical fiber unit 120. The width $W_B$ of the bottom surface 161 can be, for example, not more than 2.5 times as great as the diameter $d_2$. In in one or more embodiments, the width $W_B$ of the bottom surface 161 may be not more than twice, not more than 1.9 times, or not more than 1.5 times as great as each of the diameters $d_1$ and $d_2$. Note that the diameters $d_1$ and $d_2$ may be equal to or different from each other.

In one or more embodiments, the side walls 162 of the fiber groove 160 of the reinforcement member 130 have a shape such that the distance between the side walls 162 gradually becomes greater in the +Z direction from the bottom surface 161, and the width $W_F$ of the opening of the fiber groove 160 is greater than the width $W_B$ of the bottom surface 161. Thus, the fiber groove 160 of the reinforcement member 130 has a trapezoidal shape on a cross section thereof. Therefore, it is possible to make the thickness of the reinforcement member 130 thinner than that of the reinforcement member 130 which is configured such that the cross-sectional shape of the fiber groove 160 is a V shape. In addition, it is possible to reduce the amount of each of the securing resins 181 and 182 required inside the fiber groove 160, and therefore possible to reduce a stress which acts on each of the optical fibers 104 and 105 in a case where a corresponding one of the securing resins 181 and 182 expands or contracts due to a change in temperature and/or a change in humidity.

Furthermore, in a case where, for example, (i) the width $W_B$ of the bottom surface 161 of the fiber groove 160 is set to be not more than 2.5 times as great as the coating enclosing diameter $d_1$ of the coatings 143 of the optical fibers 104 and not more than 2.5 times as great as the outer diameter $d_2$ of the coating 153 of the optical fiber 5 and (ii) the width $W_F$ of the opening of the fiber groove 160 is set to be not more than 1.5 times as great as the width $W_B$ of the bottom surface 161, it is possible to keep the amount of each of the securing resin 181, which is present around the optical fibers 104, and the securing resin 182, which is present around the optical fiber 105, small. Therefore, it is possible to reduce a stress which acts on each of the optical fibers 104 and 105 when a corresponding one of the securing resins 181 and 182 expands or contracts due to a change in temperature and/or a change in humidity, and possible to suppress a deterioration of optical properties which deterioration is caused by the stress.

A distance $W_C$ (see FIG. 12) from the side surface 133 of the reinforcement member 130 to an edge of the fiber groove 160 which edge is located on the upper surface 131 may be not less than 0.75 times as great as a distance L from the bottom surface 161 of the fiber groove 160 to the lower surface 132 in one or more embodiments. In a case where displacement of parts 103A of the reinforcement member 130 which are located on both sides of the fiber groove 160 is increased due to expansion and/or contraction of the securing resins 181 and 182, stresses which act on the optical fibers 104 and 105 accommodated inside the fiber groove 160 become unbalanced. In such a case, the optical property M2, which is an indicator of divergence of a laser beam which propagates through an optical fiber, is deteriorated (increased). By, as described above, setting the distance $W_C$ to not less than 0.75 times as great as the distance L, rigidity of the reinforcement member 130 is increased, so that it is possible to reduce the displacement of the parts 30A of the reinforcement member 130 which are located on both the sides of the fiber groove 160. Therefore, it is possible to reduce unbalance between stresses which act on the optical fibers 104 and 105 accommodated inside the fiber groove 160, and possible to suppress a deterioration of the optical properties of a beam.

In one or more embodiments, since the width $W_B$ of the bottom surface 161 of the fiber groove 160 is greater than each of the coating enclosing diameter $d_1$ of the coatings 143 of the optical fibers 104 and the outer diameter $d_2$ of the coating 153 of the optical fiber 5, the distance between the side walls 162 of the fiber groove 160 is greater than each of the coating including diameter $d_1$ of the coatings 143 of the optical fibers 104 and the outer diameter $d_2$ of the coating 153 of the optical fiber 5. This makes it unlikely that the optical fibers 104 and 105 are brought into contact with the side walls 162 of the fiber groove 160, when the optical fibers 104 and 105 are disposed inside the fiber groove 160. It is therefore possible to reduce the effect which thermal expansion of the reinforcement member 130 exerts directly on the optical fibers 104 and 105.

It is needless to say that the number of optical fibers 104 which constitute the first optical fiber unit 110 and the number of optical fibers 5 which constitute the second optical fiber unit 120 are not limited to those illustrated in the drawings, and can be altered as appropriate. Further, in one or more embodiments, the side walls 162 of the fiber groove 160 of the reinforcement member 130 have a shape such that the distance between the side walls 162 gradually becomes greater in the +Z direction from the bottom surface 161. Note, however, that the side walls 162 of the fiber groove 160 may have any shape, provided that the width $W_F$ of the opening of the fiber groove 160 is greater than the width $W_B$ of the bottom surface 161.

Note that the terms "upper surface", "lower surface", and "bottom surface" and the other terms indicative of positional relationships, which are used in this specification, are used in connection with the embodiments illustrated in the drawings and vary depending on the relative positional relationship of an optical combiner.

Aspects of the present invention can also be expressed as follows:

An optical fiber securing structure in accordance with one or more embodiments of the present invention is an optical fiber securing structure including: an optical fiber which has a coating-removed section that is formed by removing a partial section of a coating; a reinforcement member which has a groove that is formed from one of main surfaces toward an inside and that has a pair of side walls and a bottom wall; and a resin member which secures the coating-removed section to the pair of side walls and the bottom wall, a widthwise cross-sectional shape of a bottom part of the groove which bottom part includes the bottom wall being a trapezoidal shape such that a distance between the pair of side walls becomes greater in a direction away from the bottom wall.

According to the above configuration, the widthwise cross-sectional shape of at least the bottom part of the groove, inside which the optical fiber is secured, is a trapezoidal shape. Therefore, it is possible to make the thickness of the reinforcement member thinner than that of a reinforcement member which is configured such that the cross-sectional shape of a groove inside which an optical fiber is secured is a V shape (hereinafter, referred to as a "conventional configuration"). Furthermore, it is possible to reduce the amount of the resin member, as compared with the conventional configuration.

The optical fiber securing structure in accordance with one or more embodiments of the present invention is configured such that, in one or more embodiments, the distance between the pair of side walls becomes greater in the direction away from the bottom wall.

According to the above configuration, the distance between the pair of side walls of the groove inside which the optical fiber is secured becomes greater in the direction away from the bottom wall. With this configuration, it is easy to cause a stress which the resin member can exert on the coating-removed section of the optical fiber to escape to the outside of the groove, similarly to the conventional configuration. Therefore, it is possible to keep, at substantially the same level as in the conventional configuration, the quality of a beam emitted from the optical fiber.

The optical fiber securing structure in accordance with one or more embodiments of the present invention is configured such that, in the above-described embodiments, in a case where an angle which is formed by a normal to the one of the main surfaces and one of the pair of side walls is regarded as a first inclination angle and an angle which is formed by a normal to the one of the main surfaces and the other of the pair of side walls is regarded as a second inclination angle, a sum of the first inclination angle and the second inclination angle is greater than 0 degree and not greater than 45 degrees.

According to the above configuration, when the resin material of which the resin member is made is injected into the groove, it is easy to inject the resin material into the groove without causing the resin material to leak out of the groove, as compared with a case where the sum exceeds 45 degrees. Moreover, it becomes easy to adjust the extent to which the resin material spreads in wet condition in a lengthwise direction of the groove.

The optical fiber securing structure in accordance with one or more embodiments of the present invention is configured such that, in any one of the above-described embodiments, the coating-removed section is apart from each of the pair of side walls and the bottom wall; and the resin member intervenes between the coating-removed section and each of the pair of side walls and the bottom wall.

In a case where the coating-removed section is not apart from, i.e., is in contact with at least any one of the pair of side walls and the bottom wall, an outer surface of the coating-removed section may be damaged in a time period until the coating-removed section is secured to the pair of side walls and the bottom wall. A scratch formed on a side surface of the coating-removed section may cause a decrease in strength of the coating-removed section. This can result in transmission failure in the optical fiber. According to the above configuration, the coating-removed section is not in contact with any part of the groove. Therefore, in the optical fiber securing structure in accordance with one or more embodiments, it is possible to increase reliability of the coating-removed section which is secured to the reinforcement member, i.e., reliability of the optical fiber.

The optical fiber securing structure in accordance with one or more embodiments of the present invention is configured such that, in any one of the above-described embodiments, out of interfaces of the resin member, an interface which faces the bottom wall is an interface between a resin material of which the resin member is made and a gas phase.

According to the above configuration, the resin member disposed inside the groove is not hermetically sealed, and is open to the gas phase (e.g., the atmospheric air). Therefore, in a case where the volume of the resin member is increased or decreased due to a change in temperature of an external environment, a change in volume of the resin member is not restricted from outside, as compared with a case where the resin member is hermetically sealed. Therefore, in the present optical fiber securing structure, it is easy to cause a stress which results from the change in temperature of the external environment to escape to the outside of the groove. Therefore, in the optical fiber securing structure in accordance with one or more embodiments, it is possible to prevent a deterioration of a beam quality which deterioration can occur due to the change in temperature of the external environment.

The optical fiber securing structure in accordance with one or more embodiments of the present invention is configured such that, in any one of the above-described embodiments, a resin material of which the resin member is made is a thermosetting resin.

As in the optical fiber securing structure in accordance with one or more embodiments, a thermosetting resin is suitable as the resin material.

The optical fiber securing structure in accordance with one or more embodiments of the present invention is configured such that, in any one of the above-described embodiments, a refractive index of the resin member is lower than that of an outermost shell in the coating-removed section.

According to the above configuration, it is possible to prevent leakage of light from the optical fiber to the resin member, in the coating-removed section. Therefore, it is possible to prevent the resin member from generating heat or deteriorating.

According to one or more embodiments of the present invention, an optical combiner (optical fiber securing structure) in which optical properties are unlikely to deteriorate is provided. The optical combiner includes: a plurality of first optical fibers each of which includes a core, a cladding that surrounds the core and that has a refractive index lower than that of the core, and a coating that surrounds the cladding; at least one second optical fiber which includes a core, a cladding that surrounds the core and that has a refractive index lower than that of the core, and a coating that surrounds the cladding; a reinforcement member which has a fiber groove that is formed in a first surface so as to extend in a lengthwise direction, the fiber groove being a groove inside which a coating-removed part of each of the plurality of first optical fibers, which coating-removed part is obtained by removing the coating of the each of the plurality of first optical fibers, and a coating-removed part of the at least one second optical fiber, which coating-removed part is obtained by removing the coating of the at least one second optical fiber, are accommodated; and a securing resin which secures, inside the fiber groove of the reinforcement member, the coating of each of the plurality of first optical fibers and the coating of the at least one second optical fiber. The fiber groove has a bottom surface at a given depth from the first surface of the reinforcement member. On a cross section of a part of the reinforcement member in which part the securing resin secures the coatings of the plurality of first optical fibers or the coating of the at least one second optical fiber, a width of the bottom surface of the fiber groove is greater than a diameter of a minimum circle which encloses the coatings of all of the plurality of first optical fibers. A width of an opening of the fiber groove which opening is located on the first surface of the reinforcement member is greater than the width of the bottom surface of the fiber groove. The width of the bottom surface of the fiber groove may be not more than 2.5 times, or not more than twice as great, as the diameter of the minimum circle. The width of the opening of the fiber groove may be not more than 1.5 times as great as the width of the bottom surface of the fiber groove in one or more embodiments.

According to the optical combiner thus configured, since the cross section of the fiber groove of the reinforcement member inside which fiber groove the securing resin secures the coatings of the plurality of first optical fibers or the coating of the at least one second optical fiber has a trapezoidal shape, it is possible to make the thickness of the reinforcement member thinner than that of a reinforcement member which is configured such that the cross-sectional shape of a fiber groove is a V shape. In addition, it is possible to reduce the amount of the securing resin required inside the fiber groove, and therefore possible to reduce a stress which acts on each of the optical fibers in a case where the securing resin expands or contracts due to a change in temperature and/or a change in humidity. Note that, in this specification, the "width" means a distance measured along a direction perpendicular to both the lengthwise direction and a depth direction.

The reinforcement member may include a second surface which is located opposite the first surface, and side surfaces via which the first surface and the second surface are connected to each other. In this case, on a cross section of a part of the reinforcement member in which part the securing resin secures the coatings of the plurality of first optical fibers or the coating of the at least one second optical fiber, a distance from the side surface of the reinforcement member to an edge of the fiber groove which edge is located on the first surface may be not less than 0.75 times as great as a distance from the bottom surface of the fiber groove to the second surface in one or more embodiments. By, in this manner, setting the distance from the side surface of the reinforcement member to the edge of the fiber groove which edge is located on the first surface to not less than 0.75 times as great as the distance from the bottom surface of the fiber groove to the second surface, rigidity of the reinforcement member is increased, so that it is possible to reduce displacement of parts of the reinforcement member which are located on both sides of the fiber groove. Therefore, it is possible to reduce unbalance between stresses which act on the optical fibers accommodated inside the fiber groove, and possible to suppress a deterioration of the optical properties of a beam.

A laser device in accordance with one or more embodiments of the present invention includes an optical fiber securing structure in accordance with any one of the embodiments described above.

As described above, according to the optical fiber securing structure in accordance with any one of the above-described embodiments, it is possible to make the thickness of the reinforcement member thinner than that of a conventional reinforcement member. Therefore, according to the laser device in accordance with one or more embodiments of the present invention, it is possible to reduce a space occupied by the reinforcement member in a device.

SUPPLEMENTARY NOTE

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 1A Optical fiber securing structure
2a, 2b Optical fiber
21a, 21b Core
22a, 22b, 22Aa, 22Ab Cladding
221a, 221b Inner cladding (outermost shell in coating-removed section)
222a, 222b Outer cladding
23a, 23b Coating
I Coating-removed section
3 Reinforcement member
31 Main surface
32 Groove
321, 322 Side wall (pair of side walls)
323 Bottom wall
$\theta_1$, $\theta_2$ First inclination angle, Second inclination angle
4a, 4b, 4A First resin member (Resin member)
41a, 41b, 41A Interface
5a, 5b Second resin member
P, P1a, P1b, P2a, P2b Fusion-spliced point
FL Fiber laser
101 Optical combiner (optical fiber securing structure)
104, 105 Optical fiber (first optical fiber, second optical fiber)
110 First optical fiber unit
120 Second optical fiber unit
130 Reinforcement member
131 Upper surface (first surface)
132 Lower surface (second surface)
133 Side surface
142, 152 Cladding
143, 153 Coating
145, 155 Coating-removed part
151 Core
160 Fiber groove
161 Bottom surface
162 Side wall
170 Fusion-spliced part
181, 182 Securing resin
191, 192 Refractive-index-adjusted resin

The invention claimed is:

1. An optical fiber securing structure comprising:
an optical fiber including:
a coating; and
a coating-removed section in which a partial section of the coating is removed from the optical fiber;
a reinforcement member including:
main surfaces; and
a groove formed from one of the main surfaces toward an inside of the reinforcement member, where the groove has a pair of side walls and a bottom wall; and
a resin member that secures the coating-removed section to the pair of side walls and the bottom wall, wherein
a bottom part of the groove that includes the bottom wall has a widthwise cross-sectional shape where the bottom wall constitutes a trapezoidal shape such that a distance between the pair of side walls becomes greater in a direction away from the bottom wall, and
the coating-removed section is apart from the pair of side walls and the bottom wall in a cross section orthogonal to a lengthwise direction of the optical fiber.

2. The optical fiber securing structure as set forth in claim 1, wherein the distance between the pair of side walls becomes greater in the direction away from the bottom wall.

3. The optical fiber securing structure as set forth in claim 1, wherein
a first inclination angle is formed between a normal to the one of the main surfaces and one of the pair of side walls,
a second inclination angle is formed between the normal to the one of the main surfaces and the other of the pair of side walls, and a sum of the first inclination angle and the second inclination angle is greater than 0 degree but less than or equal to 45 degrees.

4. The optical fiber securing structure as set forth in claim 1, wherein
the coating-removed section is apart from each of the pair of side walls and the bottom wall, and
the resin member is disposed between the coating-removed section and each of the pair of side walls and the bottom wall.

5. The optical fiber securing structure as set forth in claim 1, wherein an interface of the resin member that faces the bottom wall is an interface between the resin material of the resin member and a gas phase.

6. The optical fiber securing structure as set forth in claim 1, wherein the resin member is made of a thermosetting resin.

7. The optical fiber securing structure as set forth in claim 1, wherein a refractive index of the resin member is lower than that of an outermost shell in the coating-removed section.

8. A laser device comprising an optical fiber securing structure recited in claim 1.

9. An optical fiber securing structure comprising:
a plurality of first optical fibers that each include
a core,
a cladding that surrounds the core and that has a refractive index lower than that of the core, and
a coating that surrounds the cladding;
a second optical fiber that includes
a core,
a cladding that surrounds the core and that has a refractive index lower than that of the core, and
a coating that surrounds the cladding;
a reinforcement member which has a fiber groove that is formed in a first surface so as to extend in a lengthwise direction, where
a coating-removed part of each of the plurality of first optical fibers and a coating-removed part of the second optical fiber are disposed in the fiber groove,
the coating-removed part of each of the plurality of first optical fibers is obtained by removing the coating from each of the plurality of first optical fibers, and
the coating-removed part of the second optical fiber is obtained by removing the coating of the second optical fiber; and
a securing resin which secures, inside the fiber groove of the reinforcement member, the coating of each of the plurality of first optical fibers and the coating of the second optical fiber, wherein
the fiber groove has a bottom surface at a depth from the first surface of the reinforcement member, and
in a cross section of a part of the reinforcement member in which part the securing resin secures the coatings of the plurality of first optical fibers or the coating of the second optical fiber,
a width of the bottom surface of the fiber groove is greater than a diameter of a minimum circle that encloses the coatings of all of the plurality of first optical fibers, and
a width of an opening of the fiber groove located on the first surface of the reinforcement member is greater than the width of the bottom surface of the fiber groove.

* * * * *